United States Patent
Jang et al.

(10) Patent No.: US 10,200,084 B2
(45) Date of Patent: Feb. 5, 2019

(54) ELECTRONIC DEVICE AND CABLE AND METHOD OF DRIVING THE SAME

(71) Applicant: SAMSUNG ELECTRONICS CO., LTD., Suwon-si, Gyeonggi-do (KR)

(72) Inventors: Wonseok Jang, Suwon-si (KR); Jaedeok Cha, Yongin-si (KR); Sangju Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/600,850

(22) Filed: May 22, 2017

(65) Prior Publication Data
US 2017/0353215 A1   Dec. 7, 2017

(30) Foreign Application Priority Data
Jun. 3, 2016  (KR) ........................ 10-2016-0069759

(51) Int. Cl.
| H04B 17/00 | (2015.01) |
| H04B 3/46  | (2015.01) |
| H04B 17/18 | (2015.01) |
| H04B 17/19 | (2015.01) |
| H04B 3/54  | (2006.01) |
| H02J 7/00  | (2006.01) |

(52) U.S. Cl.
CPC ............... *H04B 3/46* (2013.01); *H04B 3/548* (2013.01); *H04B 17/18* (2015.01); *H04B 17/19* (2015.01); *H02J 2007/0001* (2013.01); *H02J 2007/005* (2013.01); *H02J 2007/0049* (2013.01); *H04B 2203/5441* (2013.01); *H04B 2203/5458* (2013.01)

(58) Field of Classification Search
None
See application file for complete search history.

(56) References Cited

U.S. PATENT DOCUMENTS

| 6,577,243 B1 * | 6/2003 | Dannenmann ....... H01R 13/641 324/66 |
| 7,334,072 B1 * | 2/2008 | Wright .................. G06F 13/385 710/10 |
| 7,502,878 B1 * | 3/2009 | Wright ................ G06F 13/4022 710/37 |

(Continued)

FOREIGN PATENT DOCUMENTS

| EP | 3089165 A1 * | 11/2016 | ........... H04N 19/423 |
| JP | 3196494 | 3/2015 | |

*Primary Examiner* — Berhanu Tadese
(74) *Attorney, Agent, or Firm* — Nixon & Vanderhye P.C.

(57) ABSTRACT

An electronic device, a cable, and a method of driving the same are provided. The cable that transmits data and power includes a notification device comprising notification circuitry configured to output a notification when the power is transmitted, a first connector positioned at one end of the cable, a second connector positioned at an other end of the cable, a wire connecting the first and second connectors and including a data line that transmits the data and a power line that transmits the power, and a cable controller connected to the power line and configured to identify a characteristic of power transmitted through the power line and to change a form of the notification output from the notification device based on the identified power characteristic.

20 Claims, 17 Drawing Sheets

(56) References Cited

U.S. PATENT DOCUMENTS

| | | | | |
|---|---|---|---|---|
| 7,644,203 B2* | 1/2010 | Ingles | G06F 1/266 | 710/2 |
| 7,821,212 B2* | 10/2010 | Wray | G09F 9/33 | 315/291 |
| 7,903,809 B2* | 3/2011 | Karam | G06F 1/26 | 379/413 |
| 7,908,414 B2* | 3/2011 | Combs | G06F 1/266 | 710/10 |
| 8,025,534 B2* | 9/2011 | Bates | G06F 13/409 | 439/638 |
| 8,868,792 B2* | 10/2014 | Schultz | G06F 13/385 | 710/2 |
| 8,909,951 B2* | 12/2014 | Lin | G06F 1/266 | 713/300 |
| 9,134,774 B2* | 9/2015 | Khoo | G06F 1/189 | |
| 9,158,325 B1* | 10/2015 | Lim | H02J 7/0052 | |
| 9,608,386 B2* | 3/2017 | Jenkins | H01R 13/665 | |
| 9,679,177 B2* | 6/2017 | Deal | G06K 7/10821 | |
| 9,727,109 B2* | 8/2017 | Hundal | G06F 1/266 | |
| 9,799,153 B1* | 10/2017 | Worrall | G07C 9/00031 | |
| 9,876,669 B2* | 1/2018 | Cheng | G06F 13/385 | |
| 9,877,090 B2* | 1/2018 | Cohard | H04Q 1/136 | |
| 9,900,490 B2* | 2/2018 | Ihlenburg | H04N 7/183 | |
| 2003/0062991 A1* | 4/2003 | Fisher | H04B 3/542 | 375/258 |
| 2003/0234113 A1* | 12/2003 | Strizhevskiy | H04B 3/144 | 174/33 |
| 2008/0133047 A1* | 6/2008 | Best | H01R 9/2475 | 700/215 |
| 2008/0183909 A1* | 7/2008 | Lim | G06F 13/4081 | 710/14 |
| 2008/0310850 A1* | 12/2008 | Pederson | G07C 9/00158 | 398/135 |
| 2010/0214107 A1 | 8/2010 | Montebovi | | |
| 2011/0105134 A1* | 5/2011 | Kim | H04W 72/048 | 455/450 |
| 2011/0134976 A1* | 6/2011 | Fossion | H04B 3/548 | 375/222 |
| 2011/0248835 A1* | 10/2011 | Speegle | G08C 19/02 | 340/12.32 |
| 2012/0086428 A1* | 4/2012 | Bradley, II | H04L 43/0811 | 324/66 |
| 2013/0076521 A1 | 3/2013 | Hsu | | |
| 2013/0332542 A1* | 12/2013 | Foo | G06F 13/385 | 709/206 |
| 2014/0084850 A1* | 3/2014 | Lee | G06F 1/266 | 320/107 |
| 2014/0308036 A1* | 10/2014 | Aida | H04B 3/44 | 398/45 |
| 2015/0115809 A1* | 4/2015 | Siessegger | H05B 33/0803 | 315/185 R |
| 2015/0115830 A1* | 4/2015 | Siessegger | H05B 33/0803 | 315/291 |
| 2015/0126070 A1* | 5/2015 | Candelore | H01R 33/90 | 439/628 |
| 2015/0235552 A1* | 8/2015 | Cai | H04B 3/54 | 340/12.32 |
| 2015/0326659 A1* | 11/2015 | Cheng | G06F 13/385 | 713/170 |
| 2016/0045135 A1* | 2/2016 | Kim | A61B 5/6843 | 600/391 |
| 2016/0140372 A1* | 5/2016 | Deal | G06K 7/10821 | 235/462.15 |
| 2016/0164322 A1* | 6/2016 | Li | H02J 7/00 | 320/137 |
| 2016/0216750 A1* | 7/2016 | Hundal | G06F 1/266 | |
| 2016/0269807 A1* | 9/2016 | Cohard | H04Q 1/136 | |
| 2016/0320819 A1* | 11/2016 | Atkinson | G06F 1/266 | |
| 2016/0349292 A1* | 12/2016 | Atkinson | G06F 1/28 | |
| 2017/0010659 A1* | 1/2017 | Park | G06F 1/26 | |
| 2017/0046284 A1* | 2/2017 | Doria | G06F 13/102 | |
| 2017/0105605 A1* | 4/2017 | Hebert | A61B 1/0057 | |
| 2017/0111085 A1* | 4/2017 | Pera | H04L 12/2803 | |
| 2017/0265733 A1* | 9/2017 | Yabe | A61B 1/00009 | |
| 2017/0277923 A1* | 9/2017 | Deal | G06K 7/10821 | |
| 2017/0300099 A1* | 10/2017 | Hundal | G06F 1/266 | |
| 2017/0302107 A1* | 10/2017 | Saussele | B60L 11/1816 | |
| 2017/0353215 A1* | 12/2017 | Jang | H04B 17/18 | |

* cited by examiner

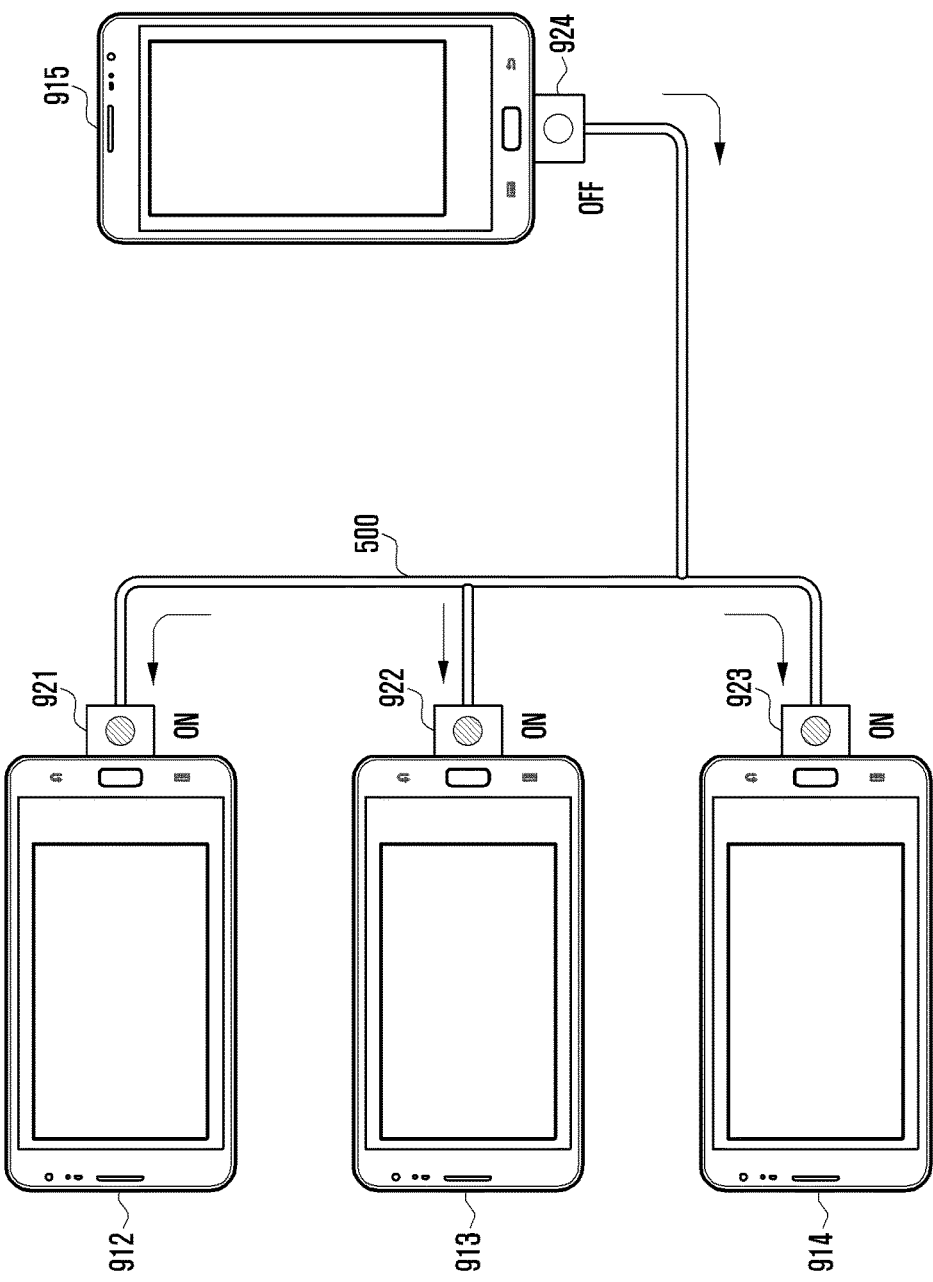

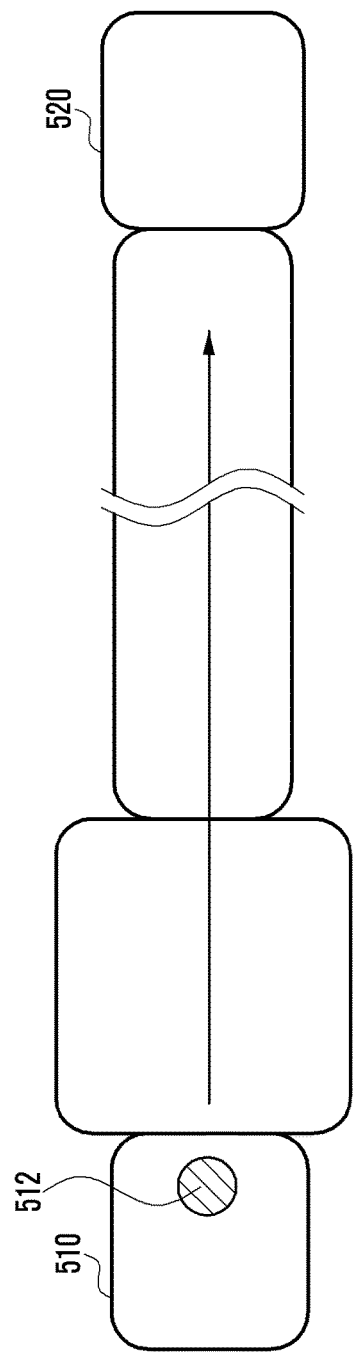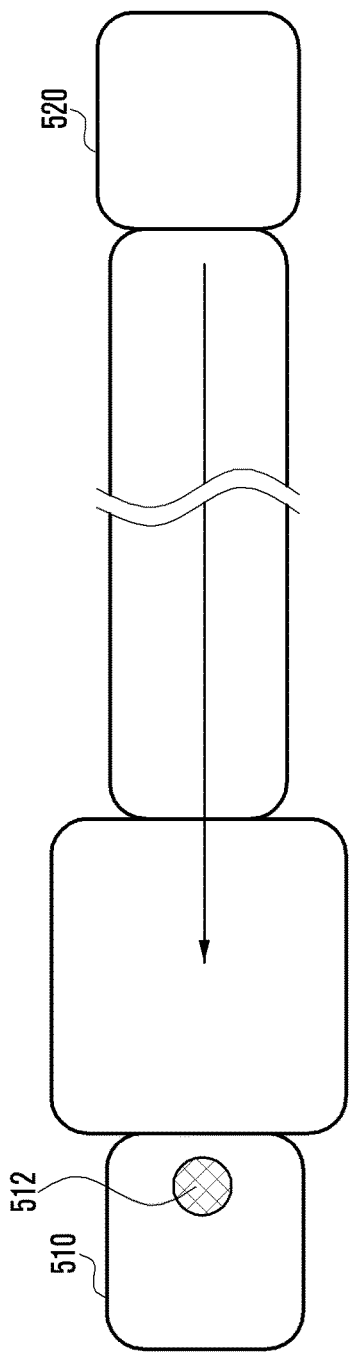
FIG. 10A
FIG. 10B

ELECTRONIC DEVICE AND CABLE AND METHOD OF DRIVING THE SAME

CROSS-REFERENCE TO RELATED APPLICATION

This application is based on and claims priority under 35 U.S.C. § 119 to a Korean patent application filed on Jun. 3, 2016, in the Korean Intellectual Property Office and assigned Serial No. 10-2016-0069759, the disclosure of which is incorporated by reference herein in its entirety.

BACKGROUND

Field

The present disclosure relates generally to an electronic device, a cable, and a method of driving the same.

Description of Related Art

In general, a cable connects electronic devices and relays transmission and reception of data between electronic devices. Further, the cable may transmit power as well as data.

Nowadays, while demand increases for improved battery charge technology of an electronic device, a protocol that transmits power bi-directionally and a cable that supports the protocol are suggested. According to bi-directional power transmission technology, a user may connect different electronic devices using a cable and transmit power bi-directionally through the cable. For example, the user may connect a Moving Picture Experts Group layer-3 (MP3) player and a smart phone using a cable. Accordingly, the user may charge a battery of the smart phone with power stored at the MP3 player or may charge a battery of the MP3 player with power charged at the smart phone battery.

However, in conventional bi-directional power transmission technology, in order for a user to determine a present state such as a voltage magnitude and a current direction, the user should directly determine a connected electronic device.

SUMMARY

The present disclosure addresses the above problems and provides an electronic device, a cable, and a method of driving the same that can provide convenience to a user by outputting a notification based on a characteristic of currently transmitted power.

In accordance with an example aspect of the present disclosure, a cable that transmits data and power includes a notification device comprising notification circuitry configured to output a notification, when the power is transmitted; a first connector positioned at one side of the cable; a second connector positioned at another side of the cable; a wire structure that connects the first and second connectors and includes a data line that transmits the data and a power line that transmits the power; and a cable controller connected to the power line and configured to identify a characteristic of power transmitted through the power line and to change a form of the notification output from the notification device based on the identified power characteristic.

In accordance with another example aspect of the present disclosure, a method of driving a cable that transmits data and power includes connecting the cable to a power line that transmits power; identifying a characteristic of power transmitted through the power line; and driving a notification device based on the identified power characteristic.

In accordance with another example aspect of the present disclosure, an electronic device includes an input and output interface circuit including a port configured to be connected to a cable including a data line that transmits data and a power line that transmits power; and a processor configured to control the input and output interface circuit, wherein the processor is configured to determine whether the cable is connected to the port, to execute an application program that provides a user interface that transmits and receives data or power through the cable, if the cable is connected to the port, to receive an input through the user interface, to transmit or receive power through the power line, and to control a notification device provided in the cable to output a notification based on a characteristic of power transmitted or received through the power line.

BRIEF DESCRIPTION OF THE DRAWINGS

The above and other various aspects, features, and attendant advantages of the present disclosure will be more apparent and readily appreciated from the following detailed description, taken in conjunction with the accompanying drawings, in which like reference numerals refer to like elements, and wherein:

FIGS. 9A and 9B are diagrams illustrating another example of transmitting power using a cable according to example embodiments of the present disclosure;

FIGS. 10A and 10B are diagrams illustrating an example in which a Light Emitting Diode (LED) is provided at only one side according to an example embodiment of the present disclosure;

DETAILED DESCRIPTION

Figure 1:
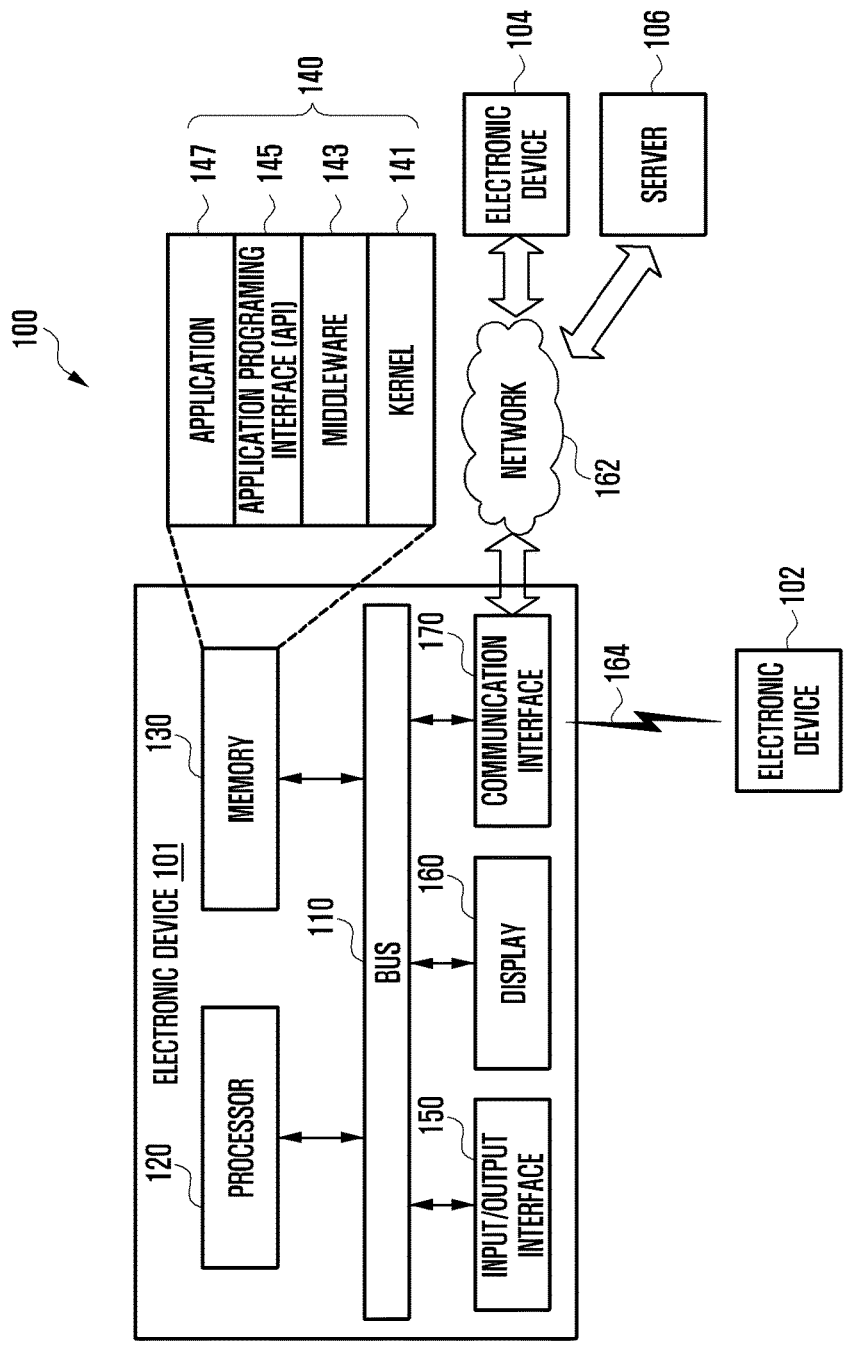
FIG. 1 is a diagram illustrating an electronic device within a network environment in various example embodiments of the present disclosure.

The following description is made with reference to the accompanying drawings and is provided to aid in a comprehensive understanding of various example embodiments of the present disclosure as defined by the claims and their equivalents. It includes various details to aid in that understanding but these are to be regarded as merely examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a television (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, or the like, but is not limited thereto. It will be apparent to those skilled in the art that the electronic device according to the present disclosure is not limited to the aforementioned devices.

FIG. 1 is a block diagram illustrating an example configuration of an electronic device in a network environment according to an example embodiment of the present disclosure.

Referring to FIG. 1, the electronic device 101 is illustrated in a network environment 100, and may include a bus 110, a processor (e.g., including processing circuitry) 120, a memory 130, an input/output interface (e.g., including input/output circuitry) 150, a display 160, a communication interface (e.g., including communication circuitry) 160, and other similar and/or suitable components.

The bus 110 may be a circuit which interconnects the above-described elements and delivers a communication (e.g., a control message) between the above-described elements.

The processor 120 may include various processing circuitry and receive commands from the above-described other elements (e.g., the memory 130, the input/output interface 150, the display 160, the communication interface 170, etc.) through the bus 110, may interpret the received commands, and may execute calculation or data processing according to the interpreted commands.

The memory 130 may store commands or data received from the processor 120 or other elements (e.g., the input/output interface 150, the display 160, the communication interface 170, etc.) or generated by the processor 120 or the other elements. The memory 130 may include programming modules, such as a kernel 141, middleware 143, an Application Programming Interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 145, for example, may perform load balancing of the work requests using a method of assigning a priority, in which system resources (e.g., the bus 110, the processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, or the like.

The input/output interface 150 may include various input/output circuitry configured to, for example, receive a command or data as input from a user, and may deliver the received command or data to the processor 120 or the memory 130 through the bus 110. The display 160 may display a video, an image, data, or the like to the user.

The communication interface 170 may include various communication circuitry configured to connect communication between another electronic device 102 and the electronic device 101. The communication interface 170 may support a predetermined short-range communication protocol 164 (e.g., Wi-Fi, BlueTooth (BT), and Near Field Communication (NFC)), or predetermined network communication 162 (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 may be a device which is identical (e.g., of an identical type) to or different (e.g., of a different type) from the electronic device 101. Further, the communication module 170 may connect communication between a server 106 and the electronic device 100 via the network 162.

Figure 2:
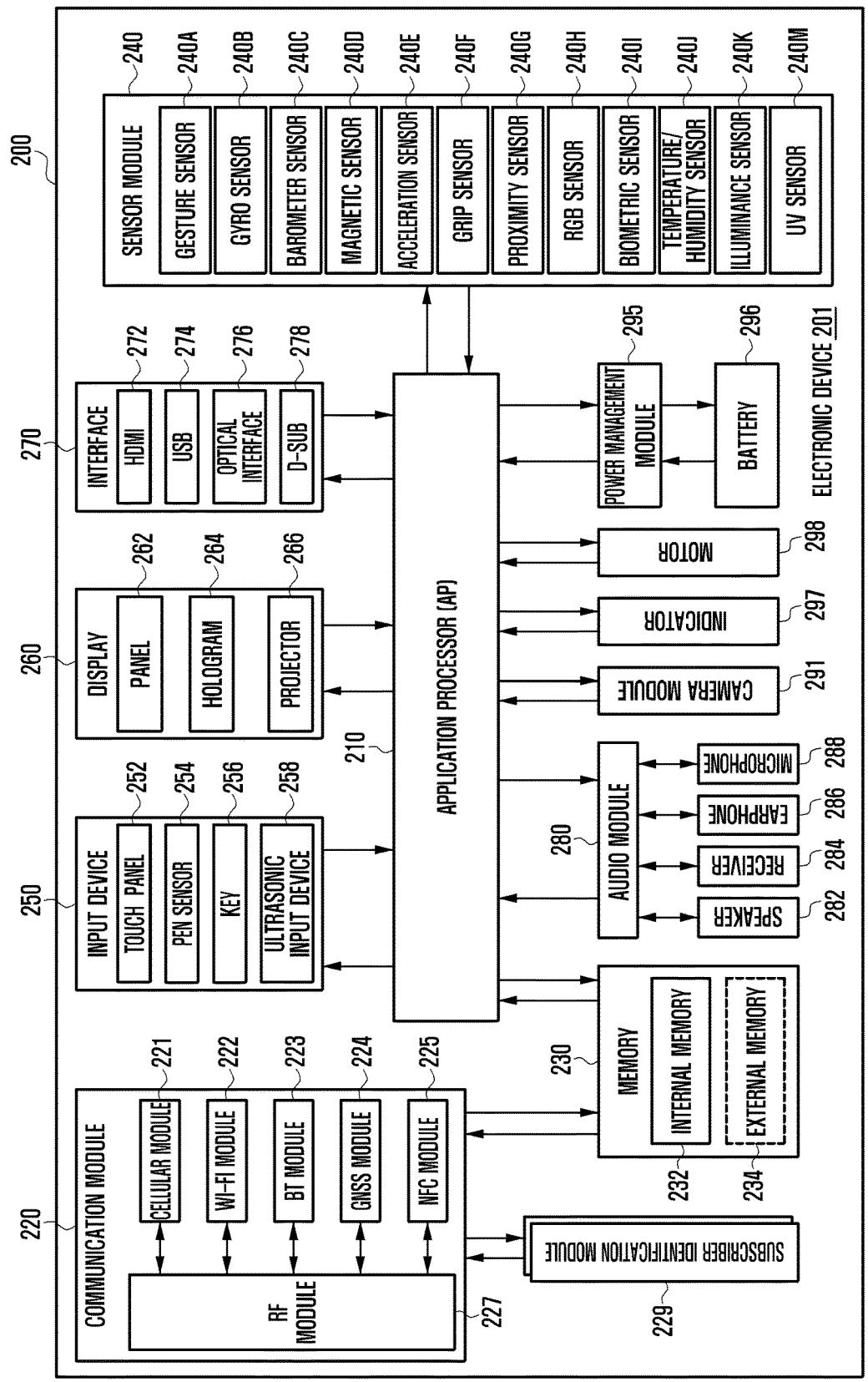
FIG. 2 is a block diagram illustrating an example electronic device according to various example embodiments of the present disclosure.

FIG. 2 is a block diagram 200 illustrating an example configuration of an electronic device 201 according to an example embodiment of the present disclosure.

The hardware 200 may be, for example, the electronic device 101 illustrated in FIG. 1.

Referring to FIG. 2, the electronic device may include one or more processors (e.g., including processing circuitry) 210, a communication module (e.g., including communication circuitry) 220, a Subscriber Identification Module (SIM) card 224, a memory 230, a sensor module 240, a input device (e.g., including input circuitry) 250, a display module 260, an interface (e.g., including interface circuitry) 270, an audio module 280, a camera module 291, a power management module 295, a battery 296, an indicator 297, a motor 298 and any other similar and/or suitable components.

The Application Processor (AP) 210 (e.g., the processor 120) may include various processing circuitry, such as, for example, and without limitation, one or more dedicated processors, CPUs, Application Processors (APs), or one or more Communication Processors (CPs). The processor 210 may be, for example, the processor 120 illustrated in FIG. 1. The AP 210 is illustrated as being included in the processor 210 in FIG. 2, but may be included in different Integrated Circuit (IC) packages, respectively. According to an embodiment of the present disclosure, the AP 210 may be included in one IC package.

The AP 210 may execute an Operating System (OS) or an application program, and thereby may control multiple hardware or software elements connected to the AP 210 and may perform processing of and arithmetic operations on various data including multimedia data. The AP 210 may be implemented by, for example, a System on Chip (SoC). According to an embodiment of the present disclosure, the AP 210 may further include a Graphical Processing Unit (GPU) (not illustrated).

The AP 210 may manage a data line and may convert a communication protocol in the case of communication between the electronic device (e.g., the electronic device 100) including the hardware 200 and different electronic devices connected to the electronic device through the network. The AP 210 may be implemented by, for example, a SoC. According to an embodiment of the present disclosure, the AP 210 may perform at least some of multimedia control functions. The AP 210, for example, may distinguish and authenticate a terminal in a communication network by using a subscriber identification module (e.g., the SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 220, the power management module 295, the memory 230, and the like are illustrated as elements separate from the AP 210. However, according to an embodiment of the present disclosure, the AP 210 may include at least some (e.g., the CP) of the above-described elements.

According to an embodiment of the present disclosure, the AP 210 may load, to a volatile memory, a command or data received from at least one of a non-volatile memory and other elements connected to each of the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 100.

The SIM card 224 may include unique identification information (e.g., Integrated Circuit Card IDentifier (ICCID)) or subscriber information (e.g., International Mobile Subscriber Identity (IMSI)).

The memory 230 may include an internal memory 232 and/or an external memory 234. The memory 230 may be, for example, the memory 130 illustrated in FIG. 1. The internal memory 232 may include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 232 may be in the form of a Solid State Drive (SSD). The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module 220 may include various communication circuitry, such as, for example, and without limitation, a cellular module 221, a wireless communication module 223 or a Radio Frequency (RF) module 229. The communication module 220 may be, for example, the communication interface 170 illustrated in FIG. 1. The communication module 220 may include various communication circuitry, such as, for example and without limitation, a Wi-Fi part 223, a BT part 225, a GPS part 227, or a NFC part 228. For example, the wireless communication module 220 may provide a wireless communication function by using a radio frequency. Additionally or alternatively, the wireless communication module 220 may include a network interface (e.g., a LAN card), a modulator/demodulator (modem), or the like for connecting the hardware 200 to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF unit 229 may include, for example, a transceiver, a Power Amplifier Module (PAM), a frequency filter, a Low Noise Amplifier (LNA), or the like. Also, the RF module 229 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, an barometer sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, an illumination (e.g., illuminance) sensor 240K, and a Ultra Violet (UV) sensor 240M. The sensor module 240 may measure a physical quantity or may sense an operating state of the electronic device 100, and may convert the measured or sensed information to an electrical signal. Additionally/alternatively, the sensor module 240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The input device 250 may include various input circuitry, such as, for example, and without limitation, a touch panel 252, a pen sensor 254 (e.g., a digital pen sensor), keys 256, and an ultrasonic input unit 258. The input device 250 may be, for example, the user input module 140 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the hardware 200 may receive a user input from an external device (e.g., a network, a computer, or a server), which is connected to the communication module 230, through the communication module 230.

The display module 260 may include a panel 262, a hologram 264, or projector 266. The display module 260 may be, for example, the display module 150 illustrated in FIG. 1. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may include the touch panel 252 and one module. The hologram 264 may display a three-dimensional image in the air by using interference of light. According to an embodiment of the present disclosure, the display module 260 may further include a control circuit for controlling the panel 262 or the hologram 264.

The interface 270 may include various interface circuitry, such as, for example, and without limitation, a High-Definition Multimedia Interface (HDMI) 272, a Universal Serial Bus (USB) 274, an optical interface 276, and a D-subminiature (D-sub) 278. Additionally or alternatively, the interface 270 may include, for example, SD/Multi-Media Card (MMC) (not illustrated) or Infrared Data Association (IrDA) (not illustrated).

The audio codec 280 may bidirectionally convert between a voice and an electrical signal. The audio codec 280 may convert voice information, which is input to or output from the audio codec 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an Image Signal Processor (ISP) (not illustrated), and a flash LED (not illustrated).

The power management module 295 may manage power of the hardware 200. Although not illustrated, the power management module 295 may include, for example, a Power Management Integrated Circuit (PMIC), a charger Integrated Circuit (IC), or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware 200 or a part (e.g., the AP 211) of the hardware 200, for example, a booting state, a message state, a charging state and the like. The motor 298 may convert an electrical signal into a mechanical vibration. The processor 210 may control the sensor module 240.

Although not illustrated, the hardware 200 may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like. Each of the above-described elements of the hardware 200 according to an embodiment of the present disclosure may include one or more components, and the name of the relevant element may change depending on the type of electronic device. The hardware 200 according to an embodiment of the present disclosure may include at least one of the above-described elements. Some of the above-described elements may be omitted from the hardware 200, or the hardware 200 may further include additional elements. Also, some of the elements of the hardware 200 according to an embodiment of the present disclosure may be combined into one entity, which may perform functions identical to those of the relevant elements before the combination.

The term "module" used in the present disclosure may refer to, for example, a unit including one or more combinations of hardware (e.g., circuitry), software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include, for example, and without limitation, at least one of processing circuitry, a dedicated processor, a CPU, an Application-Specific Integrated Circuit (ASIC) chip, a Field-Programmable Gate Array (FPGA), and a programmable-logic device for performing certain operations which have been known or are to be developed in the future.

Figure 3:
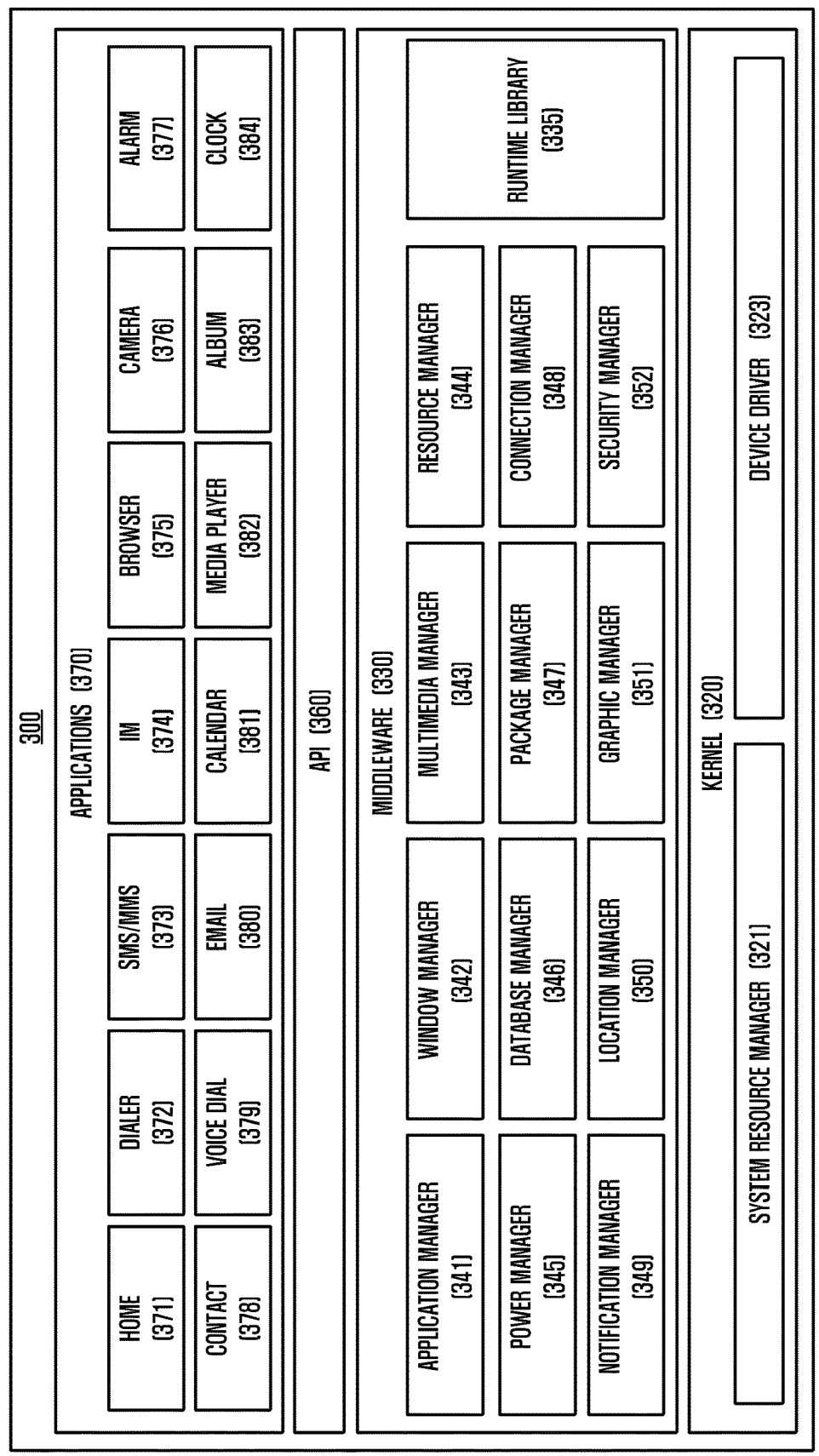
FIG. 3 is a block diagram illustrating an example program module according to various example embodiments of the present disclosure.

FIG. 3 is a block diagram illustrating an example configuration of a programming module 300 according to an example embodiment of the present disclosure.

The programming module 300 may be included (or stored) in the electronic device 100 (e.g., the memory 130) or may be included (or stored) in the electronic device 200 (e.g., the memory 230) illustrated in FIG. 1. At least a part of the programming module 300 may be implemented in software, firmware, hardware, or a combination of two or more thereof. The programming module 300 may be implemented in hardware (e.g., the hardware 200), and may include an OS controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 300 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

A cable that transmits data and power according to various example embodiments of the present disclosure includes a notification device that outputs a notification, when the power is transmitted; a first connector positioned at one side; a second connector positioned at the other side; a wire structure that connects the first and second connectors and includes a data line that transmits the data and a power line that transmits the power; and a cable controller connected to the power line to identify a characteristic of power transmitted through the power line and that changes a form of the notification output from the notification device based on the identified power characteristic.

The cable controller may identify a magnitude of a voltage, a magnitude of a current, and a direction of a current transmitted through the power line and output a driving signal that drives the notification device according to an identified result.

The cable controller may include a sensing unit that senses a both-end voltage at a specific segment of the power line, a controller that compares magnitudes of the both-end voltage and that outputs a comparison result, and a driver that determines at least one condition that drives the notification device according to a comparison result and that outputs a driving signal based on the determined condition.

The notification device may be configured with a light emitting line positioned parallel to the data line or the power line and that outputs light in response to the driving signal.

The light emitting line may be configured with a single line or a plurality of lines that output light of a plurality of colors and be configured to output light of a color corresponding to the driving signal.

The notification device may be configured with at least one Light Emitting Diode (LED) positioned at any one of the first and second connectors and that outputs light in response to the driving signal.

The at least one LED may be configured with a single LED element or a plurality of LED elements that output light of a plurality of colors and be configured to output light of a color corresponding to the driving signal.

The notification device may be configured with at least one LED positioned at each of the first and second connectors and may be configured to output light in response to the driving signal.

The at least one LED may be configured with a single LED element or a plurality of LED elements that output light of a plurality of colors and may be configured to output light of a color corresponding to the driving signal.

At least one condition that drives the notification device may be a single condition or a plurality of conditions selected from a color of light, brightness of light, a lighting position, whether light is flickered, and a flickering speed.

The first connector may be configured with a single connector or a plurality of connectors, and the second connector may be configured with a single connector or a plurality of connectors.

Figure 4:
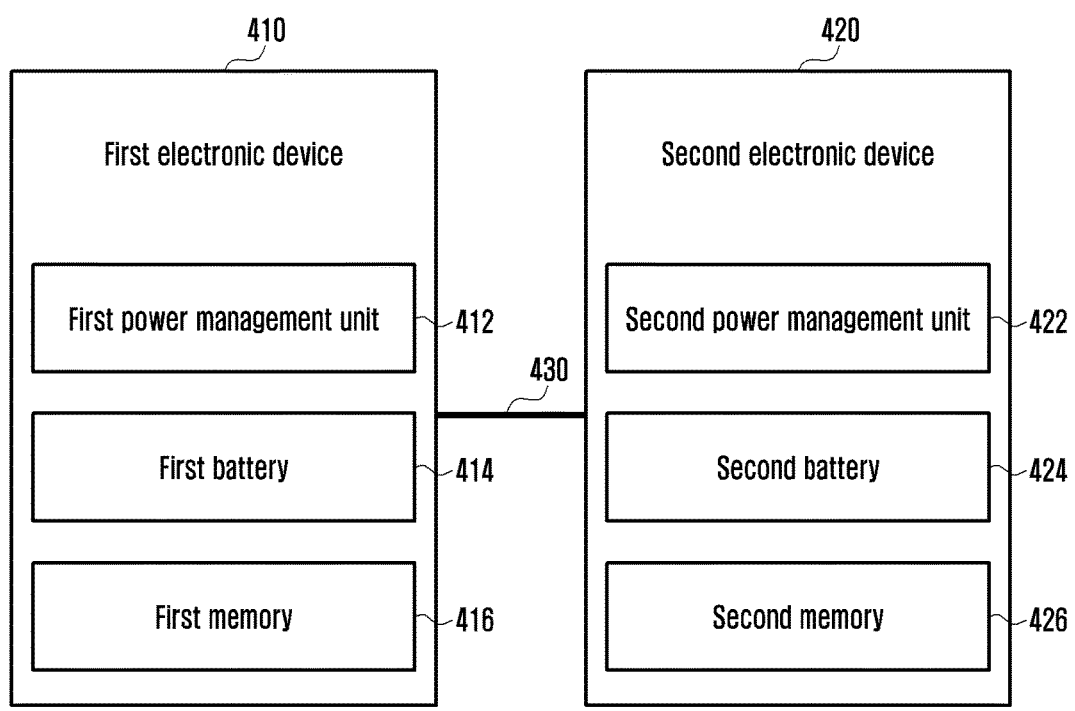
FIG. 4 is a block diagram illustrating an example power and data transmitting environment between electronic devices according to various example embodiments of the present disclosure.

FIG. 4 is a block diagram illustrating an example power and data transmitting environment between electronic devices according to various example embodiments of the present disclosure.

With reference to FIG. 4, an electronic device according to various example embodiments of the present disclosure may include a first electronic device 410, second electronic device 420, and a cable 430.

According to an example embodiment, the first and second electronic devices 410 and 420 may have the same configuration or a similar configuration. Alternatively, the first and second electronic devices 410 and 420 may have the same configuration as that of the electronic device 101 of FIG. 1 or may have a configuration similar to that of the electronic device 101 of FIG. 1.

The first electronic device 410 may include a first battery 414 that stores power, a first memory 416 that stores specific data, and a first power management unit 412 that manages the first battery 414 to supply power to each component of the first electronic device 410. The first electronic device 410 may further include a port (not shown) for connecting the cable 430.

The second electronic device 420 may include a second battery 424 that stores power, a second memory 426 that stores specific data, and a second power management unit 422 that manages the second battery 424 to supply power to each component of the second electronic device 420. The second electronic device 420 may further include a port (not shown) for connecting the cable 430.

The cable 430 is connected to a plurality of electronic devices, for example the first and second electronic devices 410 and 420. The cable 430 performs a function of transmitting data or power stored in at least one of a connected plurality of electronic devices to another electronic device. According to various example embodiments, the cable 430 may have a form that supports one-to-one connection, one-to-many connection, and many-to-many connection. Therefore, in a state in which a plurality of electronic devices are connected with one-to-one connection, one-to-many connection, or many-to-many connection, the cable 430 may transmit data or power stored at a specific electronic device to another electronic device.

The cable 430 according to various example embodiments of the present disclosure may output a notification that provides a magnitude of a voltage and a magnitude and direction of a current when transmitting power. A notification output from the cable 430 may be a single notification or a plurality of notifications selected from a vibration (haptic), light, and sound (alarm).

The first and second electronic devices 410 and 420 may transmit data stored at each memory through the cable 430. For example, the first electronic device 410 may transmit specific data stored at the first memory 416 to an external electronic device, for example the second electronic device 420, through the cable 430. In this case, the second electronic device 420 may store at the second memory 426 specific data that the first electronic device 410 transmits through the cable 430. In contrast, the second electronic device 420 may transmit specific data stored at the second memory 426 to the first electronic device 410 through the cable 430. In this case, the first electronic device 410 may store at the first memory 416 specific data that the second electronic device 420 transmits through the cable 430.

The first and second electronic devices 410 and 420 may transmit power stored at each battery through the cable 430. For example, the first electronic device 410 may transmit power stored at the first battery 414 to an external electronic device, for example the second electronic device 420, through the cable 430. In this case, the second electronic device 420 receives power transmitted from the first electronic device 410 through the cable 430, thereby charging the second battery 424. In this case, the cable 430 may output a first notification based on a direction of a first current transmitted from the first electronic device 410 to the second electronic device 420 and a magnitude of a voltage and a current. In contrast, the second electronic device 420 may transmit power stored at the second battery 424 to the first electronic device 410 through the cable 430. In this case, the first electronic device 410 receives power transmitted from the second electronic device 420 through the cable 430, thereby charging the first battery 414. In this case, the cable 430 may output a second notification based on a direction of a second current transmitted from the second electronic device 420 to the first electronic device 410 and a magnitude of a voltage and a current.

According to an example embodiment, first and second notifications may be differently set. For example, when a notification is a vibration, the first and second notifications may have different vibration patterns. Further, when a notification is light, first and second notifications may be disposed with different colors or different flickering and different positions. Further, when a notification is sound, first and second notifications may have different melodies or different patterns.

In an example embodiment, a notification output from the cable 430 may be set to light because the notification output in a form of light may be most easily identified by a user. Therefore, in the following description, it should be noted that a notification of the cable 430 is light, but a notification may be a vibration and sound.

Figure 5:
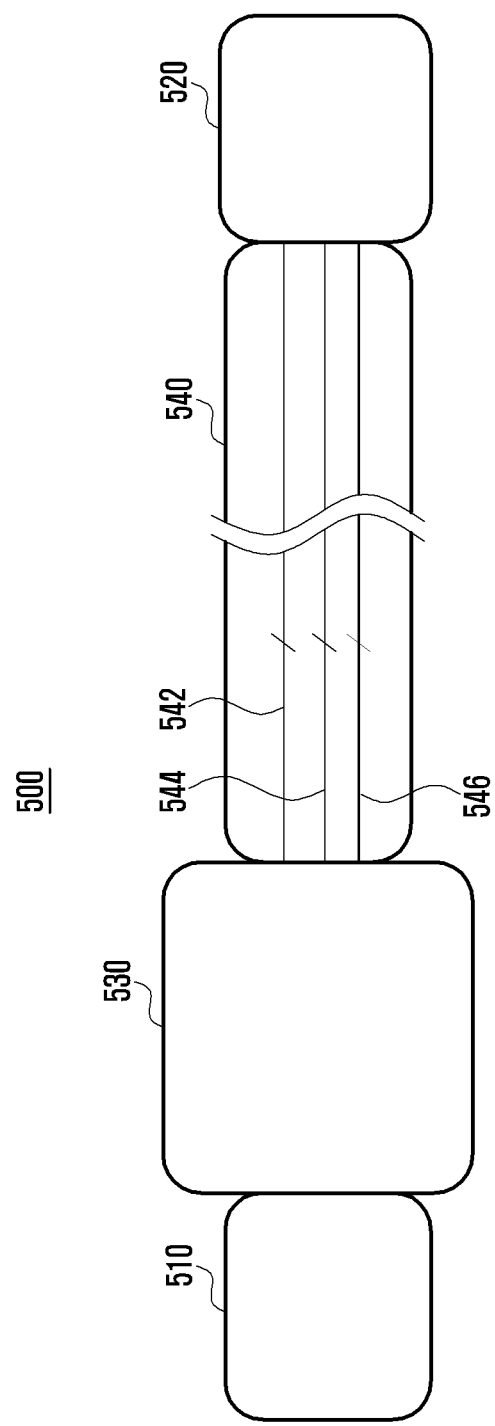
FIG. 5 is a block diagram illustrating an example configuration of a cable according to various example embodiments of the present disclosure.

FIG. 5 is a block diagram illustrating an example configuration of a cable according to an example embodiment of the present disclosure.

With reference to FIG. 5, a cable 500 may include a first connector 510 positioned at one side, a second connector 520 positioned at the other side, a wire structure 540 including a data line 542 that connects the first and second connectors 510 and 520 to transmit data and a power line 544 that transmits power, and a cable controller 530 connected to the power line 544. Further, when power is transmitted through the power line 544, the cable 500 may further include a notification device that outputs a notification. For example, as shown in FIG. 5, the cable 500 may include a light emitting line 546 configured within the wire structure 540 as a notification device.

At least a portion of the first connector 510 may be inserted into a port provided at any one of a plurality of electronic devices to be connected to the electronic device. According to an example embodiment, the first connector 510 may be configured with a single connector or a plurality of connectors.

At least a portion of the second connector 520 may be inserted into a port provided at another electronic device of a plurality of electronic devices to be connected to the electronic device. According to an example embodiment, the second connector 520 may be configured with a single connector or a plurality of connectors.

An outer surface of the wire structure 540 may be covered with a transparent insulating material, and the wire structure 540 may include a plurality of lines 542 and 544 for transmitting data and power therein. The plurality of lines 542 and 544 may include a plurality of data lines 542 for transmitting data and a plurality of power lines 544 for transmitting power. According to an example embodiment, the wire structure 540 may further include a light emitting line 546 that outputs light to instruct a characteristic of power transmitted from the power line 544.

The light emitting line 546 may be configured with a single line or a plurality of lines that output light of a plurality of colors. The light emitting line 546 may be configured to output light in response to a driving signal provided from the cable controller 530. For example, the light emitting line 546 may output light of a color changed to correspond to a characteristic of power in response to a driving signal.

The cable controller 530 may be connected to the power line 544 to determine a characteristic of power transmitted through the power line 544 and may change a form of a notification output from the notification device (the light emitting line 546) based on the determined power characteristic. According to an example embodiment, the cable controller 530 may be positioned between the first connector 510 and the wire structure 540.

The cable controller 530 may determine at least one condition that drives the notification device according to a characteristic of power transmitted through the power line 544 and output a driving signal that drives the notification device, for example the light emitting line 546 based on the determined condition. According to an example embodiment, the cable controller 530 may sense at least one of a magnitude of a voltage, a magnitude of a current, and a direction of a current transmitted through the power line 544 as a characteristic of power and determine a condition that drives the notification device according to a sensed result. According to an example embodiment, at least one condition that drives the notification device may be a single condition or a plurality of conditions selected from a color of light, brightness of light, a lighting position, whether light is flickered, and a flickering speed. According to another example embodiment, the notification device may output a predetermined specific word or phrase. For example, the notification device may selectively drive a plurality of LED elements to display a specific word or phrase. In this case, the specific word or phrase may be set or changed based on a user input.

Figure 6:
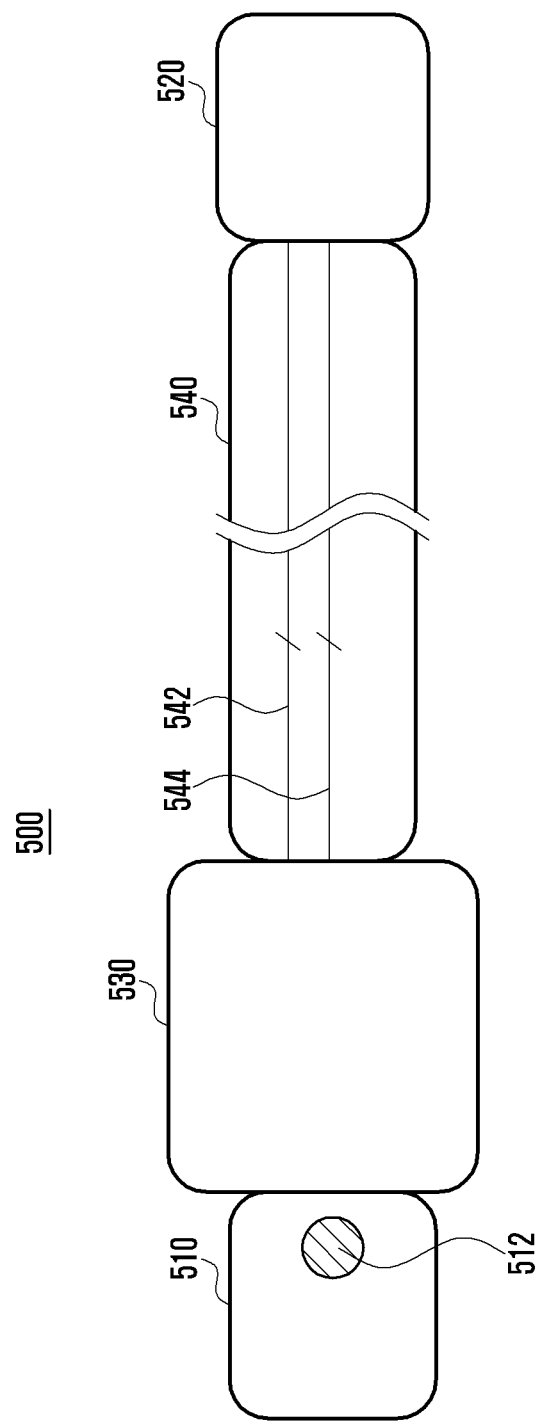
FIG. 6 is a block diagram illustrating an example configuration of a cable according to another example embodiment of the present disclosure.

FIG. 6 is a block diagram illustrating an example configuration of a cable according to another example embodiment of the present disclosure.

With reference to FIG. 6, in another example embodiment of the present disclosure, a notification device may be different from the cable 500 of FIG. 5. Hereinafter, in another example embodiment of the present disclosure and a description described with reference to FIG. 6, elements identical to or corresponding to the cable 500 of FIG. 5 are denoted by the same reference numerals; therefore, a detailed description thereof is omitted.

As illustrated in FIG. 6, the cable 500 may include at least one LED 512 positioned at any one of the first and second connectors 510 and 520 as the notification device and that outputs light in response to a driving signal provided from the cable controller 530. In the illustrated example, the LED 512 is positioned at the first connector 510, but according to another example embodiment, the LED 512 may be positioned at the second connector 520.

According to an example embodiment, at least one LED 512 may be configured with a single LED element or a plurality of LED elements that output light of a plurality of colors. The at least one LED 512 may be configured to output light in response to a driving signal provided from the cable controller 530. The at least one LED 512 may output light of a color changed to correspond to a characteristic of power in response to a driving signal. In this example, the light emitting line 546 may be omitted.

Figure 7:
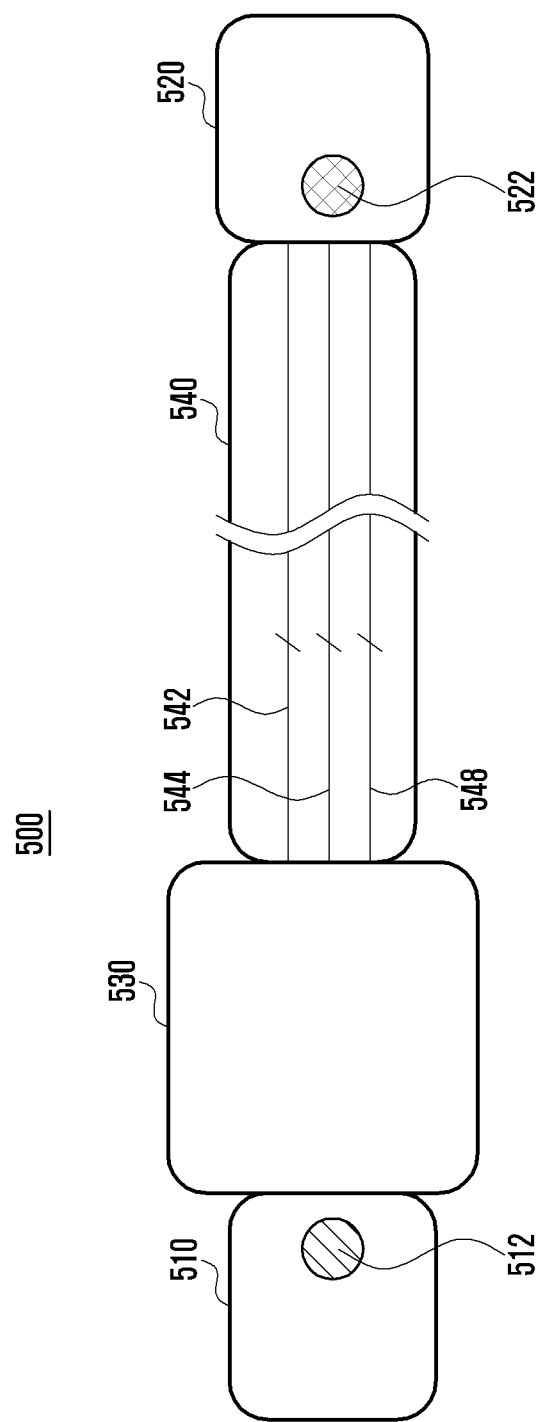
FIG. 7 is a block diagram illustrating an example configuration of a cable according to another example embodiment of the present disclosure.

FIG. 7 is a block diagram illustrating an example configuration of a cable according to another example embodiment of the present disclosure.

With reference to FIG. 7, in another example embodiment of the present disclosure, a notification device may be changed from the cable 500 of FIG. 5. Hereinafter, in another example embodiment of the present disclosure and a description described with reference to FIG. 7, elements identical to or corresponding to the cable 500 of FIG. 5 are denoted by the same reference numerals; therefore, a detailed description thereof is omitted.

As illustrated in FIG. 7, the cable 500 may include at least one LED positioned at each of the first and second connectors 510 and 520 as a notification device and that outputs light in response to a driving signal provided from the cable controller 530. For example, the LED may include a first LED 512 positioned on the first connector 510 and a second LED 522 positioned on the second connector 520. According to an example embodiment, the first and second LEDs 512 and 522 may be independently driven in response to a driving signal provided from the cable controller 530.

According to an example embodiment, the first and second LEDs 512 and 522 each may be configured with a single LED element or a plurality of LED elements that output light of a plurality of colors. The first and second LED each may output light of a color changed to correspond to a characteristic of power in response to a driving signal.

According to an example embodiment, a wire structure may further include a driving signal line 548 that transmits a driving signal provided from the cable controller 530. The driving signal line 548 is configured to transfer a driving signal to the LED 522 relatively separated from the cable controller 530 among the first and second LEDs 512 and 522. For example, in a shown example, the second LED 522 of the first and second LEDs 512 and 522 is relatively separated from the cable controller 530. Therefore, the second LED 522 may receive a driving signal through the driving signal line 548. According to an example embodiment, the driving signal line 548 may be configured with a single line or a plurality of lines.

Figure 8:
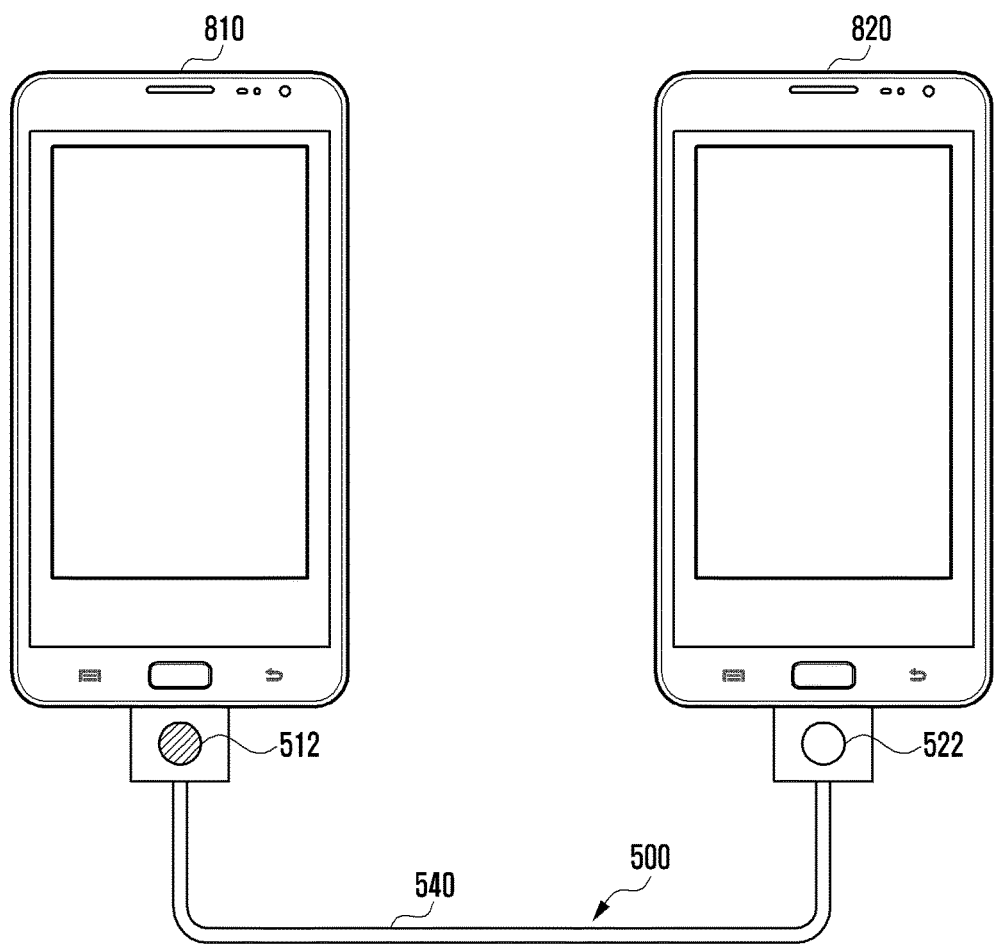
FIG. 8 is a diagram illustrating an example of transmitting power using a cable according to an example embodiment of the present disclosure.

FIG. 8 is a diagram illustrating an example of transmitting power using a cable according to an example embodiment of the present disclosure.

With reference to FIG. 8, for example, the cable 500 may be connected to first and second electronic devices 810 and 820, and the first and second electronic devices 810 and 820 may be smart phones.

According to an example embodiment, when the cable 500 is connected to the first and second electronic devices 810 and 820, the cable 500 may determine a characteristic of power transmitted through the power line 544 and output a notification based on the determined power characteristic.

For example, a notification may be output in a form in which the light emitting line 546 of the wire structure 540 outputs light or a form in which the LEDs 512 and 522 positioned on a connector output light. For example, when transmitting power stored at the first electronic device 810 to the second electronic device 820, only the first LED 512 of the first and second LEDs 512 and 522 may emit light. Alternatively, when transmitting power stored at the first electronic device 810 to the second electronic device 820, the light emitting line 546 may output light of a predetermined red color. Alternatively, when transmitting power stored at the second electronic device 820 to the first electronic device 810, only the second LED 522 of the first and second LEDs 512 and 522 may emit light. Alternatively, when transmitting power stored at the second electronic device 820 to the first electronic device 810, the light emitting line 546 may output light of a predetermined blue color.

Therefore, by determining a notification output from the cable 500 instead of directly determining from a connected smart phone, a user can easily determine a characteristic of currently transmitted power.

Figure 9A:
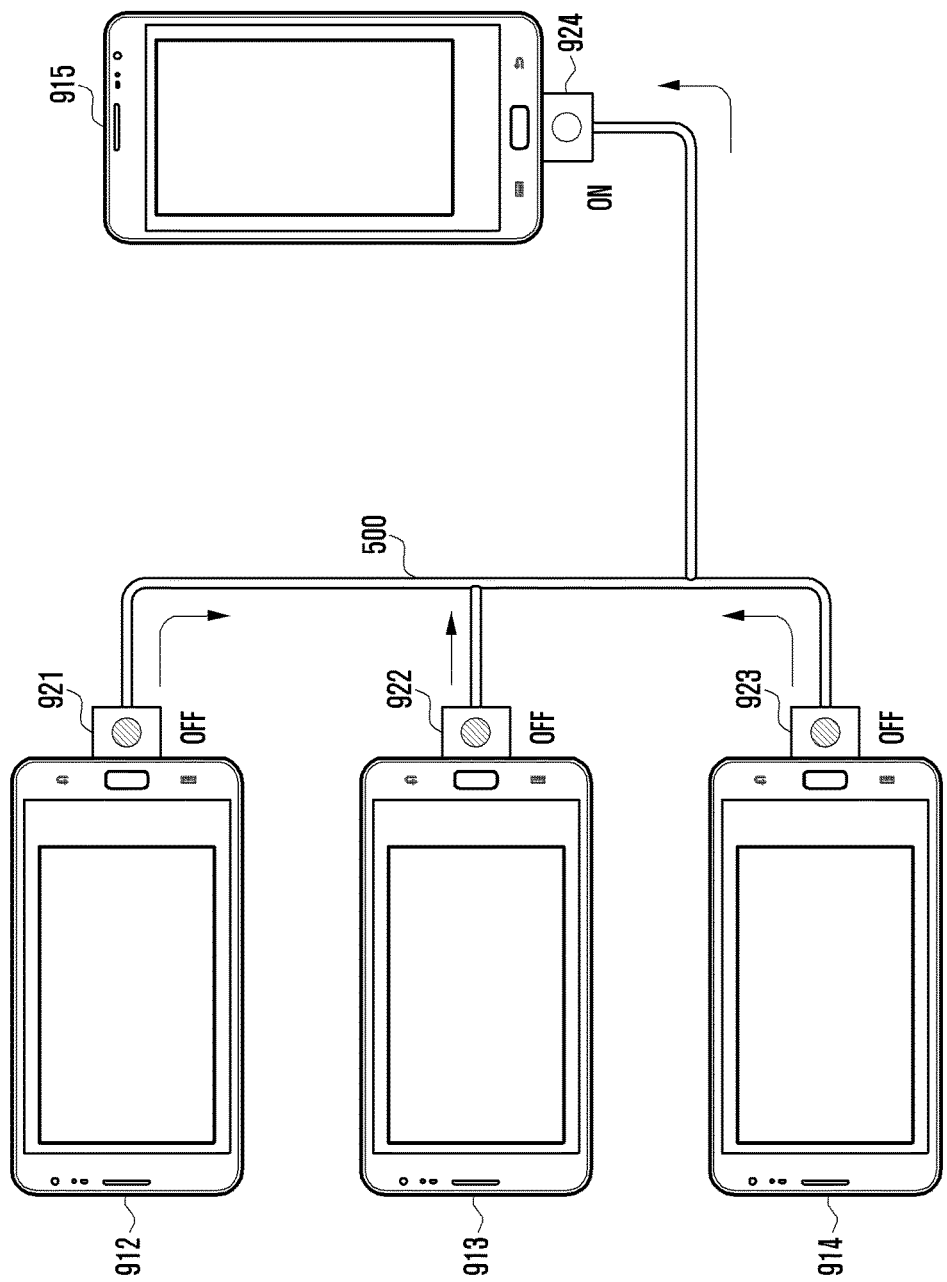

FIGS. 9A and 9B are diagrams illustrating another example of transmitting power using a cable according to example embodiments of the present disclosure.

With reference to FIGS. 9A and 9B, in a state in which a plurality of electronic devices 912, 913, 914, and 915 are connected with a one-to-many connection and many-to-many connection, the cable 500 may transmit data or power stored at a specific electronic device to another electronic device. For example, the cable 500 may be connected to the first to fourth electronic devices 912, 913, 914, and 915, and the first to fourth electronic device 912, 913, 914, and 915 may be smart phones.

According to an example embodiment, when the cable 500 is connected to the first to fourth electronic devices 912, 913, 914, and 915, the cable 500 may determine a characteristic of power transmitted through the power line 544 and output a notification based on the determined power characteristic. For example, a notification may be output in a form in which the light emitting line 546 of the wire structure 540 outputs light or a form in which LEDs 921, 922, 923, and 924 positioned on the connector output light. For example, as illustrated in FIG. 9A, when transmitting power stored at the first to third electronic devices 912, 913, and 914 to the fourth electronic device 915, the LEDs 921, 922, and 923 on connectors connected to the first to third electronic devices 912, 913, and 914 may be turned off, and the LED 924 on the connector connected to the fourth electronic device 915 may output light. Alternatively, as illustrated in FIG. 9B, when transmitting power stored at the fourth electronic device 915 to the first to third electronic devices 912, 913, and 914, the LEDs 921, 922, and 923 on connectors connected to the first to third electronic devices 912, 913, and 914 may output light, and the LED 924 on the connector connected to the fourth electronic device 915 may be turned off.

Hereinafter, a method in which a cable notifies a characteristic of power according to various example embodiments of the present disclosure is described in detail.

FIGS. 10A and 10B are diagrams illustrating an example in which an LED is provided at only one side. In FIGS. 10A and 10B, an arrow may represent a direction of a current transmitted through the power line 544.

With reference to FIGS. 10A and 10B, the cable 500 according to an example embodiment may notify a characteristic of power transmitted through the power line 544 using the LED 512 provided at one side. For example, the cable 500 may notify a magnitude of a voltage or a current and a direction of a current according to a color of light, brightness of light, and a flickering speed of light output from the LED 512. According to another example embodiment, the cable 500 may notify a characteristic of power transmitted through the power line 544 using the light emitting line 546. In this case, the cable 500 may notify a magnitude of a voltage or a current and a direction of a current according to a color of light, brightness of light, and a flickering speed of light output from the light emitting line 546.

For example, as illustrated in FIG. 10A, when power is transmitted in a first direction advancing from the first connector 510 to the second connector 520, the cable 500 may output light of a predetermined red color and change brightness of light of a red color in proportional to a magnitude of a transmitted voltage. Alternatively, as illustrated in FIG. 10B, when power is transmitted in a second direction opposite to the first direction, the cable 500 may output light of a predetermined blue color and change brightness of light of a blue color in proportion to a magnitude of a transmitted voltage.

FIGS. 11A, 11B, 11C and 11D are diagrams illustrating an example in which LEDs are provided at both sides. In FIGS. 11A-11D, an arrow may represent a direction of a current transmitted through the power line 544.

With reference to FIGS. 11A-11D, the cable 500 according to another example embodiment may notify a characteristic of power transmitted through the power line 544 in more various forms using the LEDs 512 and 522 provided at both sides.

Figure 11A:
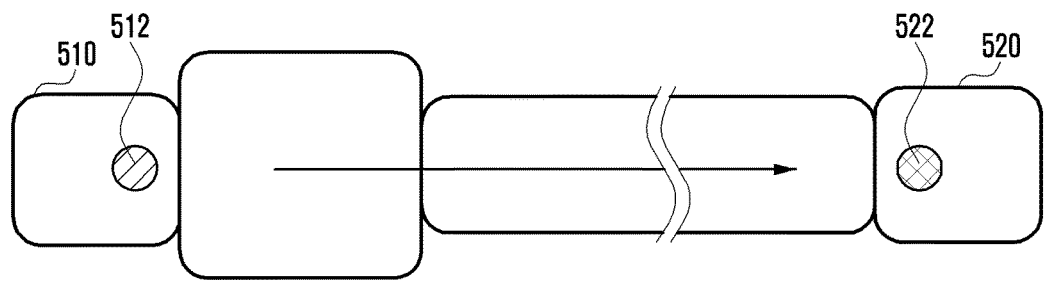
FIGS. 11A, 11B, 11C and 11D are diagrams illustrating an example in which LEDs are provided at both sides according to example embodiments of the present disclosure.
Figure 11B:
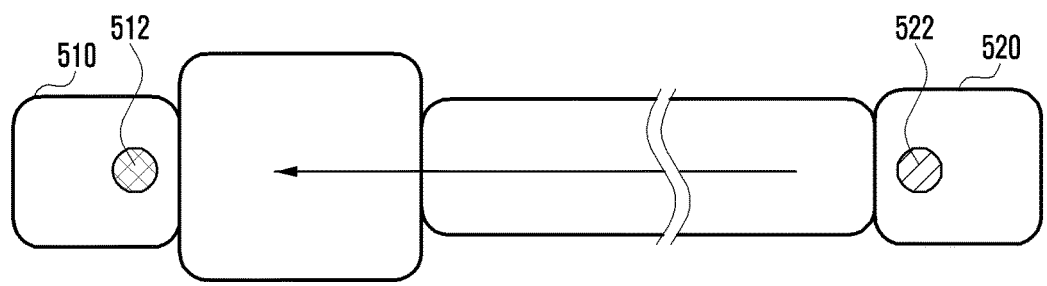
Figure 11C:
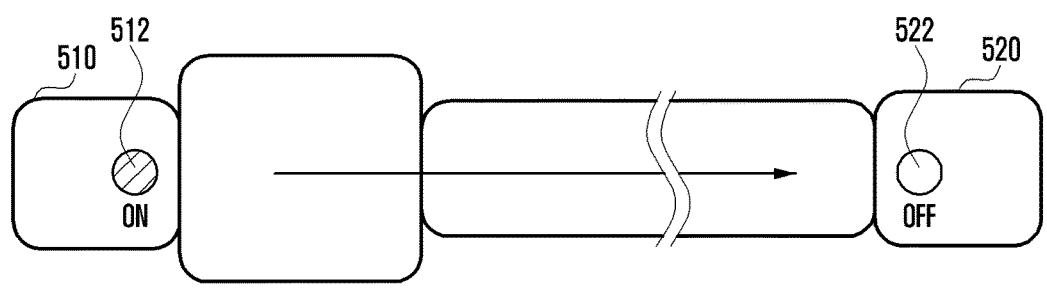
Figure 11D:
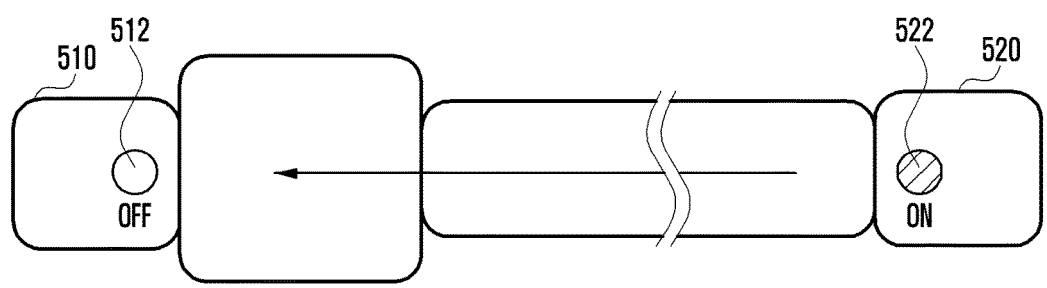

For example, with reference to FIGS. 11A and 11B, the cable 500 may set one side or the other side to the transmitting side or the receiving side according to a transmitting direction of power, i.e., a transmitting direction of a current, and set an LED positioned at the receiving side to output light of a first color and an LED positioned at the transmitting side to output light of a second color. For example, the cable 500 may set an LED of the transmitting side to output red light as a first color and an LED of the receiving side to output blue light as a second color. With reference to FIG. 11A, when power is transmitted in a first direction advancing from the first connector 510 to the second connector 520, the first LED 512 may output red light, the second LED 522 may output blue light, and the cable 500 may change brightness of light output from the first and second LEDs 512 and 522 in proportion to a magnitude of a transmitted voltage. Further, with reference to FIG. 11B, in the cable 500, when power is transmitted in a second direction opposite to the first direction, the first LED 512 may output blue light, the second LED 522 may output red light, and the cable 500 may change brightness of light output from the first and second LEDs 512 and 522 in proportion to a magnitude of a transmitted voltage.

According to another example embodiment, in the cable 500, an LED positioned at the transmitting side is turned on, an LED positioned at the receiving side is turned off, and a voltage may be represented with a color and brightness of the turned on LED. For example, with reference to FIGS. 11C and 11D, the cable 500 may turn on or off the first and second LEDs 512 and 522 based on a transmitting direction of power. According to an example embodiment, the cable 500 may output light of a color matched to a magnitude of a voltage transmitted through the power line 544. A color which the cable 500, according to various example embodiments, outputs as a notification according to a transmitted voltage is described in Table 1. Table 1 serves as an illustration, and a range of a voltage and a color matched to the voltage may be variously changed.

TABLE 1

| Voltage magnitude (V) | Color |
| --- | --- |
| 1 | red |
| 2 | yellowish red |
| 3 | orange |
| 4 | reddish yellow |
| 5 | yellow |
| 6 | greenish yellow |
| 7 | green yellow |
| 8 | yellowish green |
| 9 | green |
| 10 | bluish green |
| 11 | cyan |
| 12 | greenish blue |
| 13 | blue |
| 14 | purplish blue |
| 15 | violet |
| 16 | bluish purple |
| 17 | purple |
| 18 | reddish purple |
| 19 | magenta |
| 20 | purplish red |

According to an example embodiment, the cable 500 may control to flicker the LEDs 512 and 522 according to a magnitude of a current transmitted through the power line 544. For example, the cable 500 may increase a flickering speed in proportion to a magnitude of a current.

A method of driving a cable that transmits data and power according to various example embodiments of the present disclosure includes being connected by the cable to a power line that transmits power and identifying a characteristic of power transmitted through the power line, and driving a notification device based on the identified power characteristic.

Identifying a characteristic of power transmitted through the power line may include identifying a magnitude of a voltage, a magnitude of a current, and a direction of a current transmitted through the power line.

Driving a notification device based on the identified power characteristic may include outputting a driving signal that drives the notification device according to the identified result.

Identifying a characteristic of power transmitted through the power line may include sensing a both-end voltage at a specific segment of the power line, comparing magnitudes of the both-end voltage and outputting a comparison result, and determining at least one condition that drives the notification device according to the comparison result and outputting the driving signal based on the determined condition.

The notification device may be configured with a light emitting line positioned parallel to the power line and that outputs light in response to the driving signal.

The notification device may be configured with LEDs positioned in at least one of a first connector positioned at one side and a second connector positioned at the other side and that output light in response to the driving signal.

At least one condition that drives the notification device may be a single condition or a plurality of conditions selected from a color of light, brightness of light, a lighting position, whether light is flickered, and a flickering speed.

Hereinafter, a configuration and operation of a cable controller will be described in detail.

Figure 12:
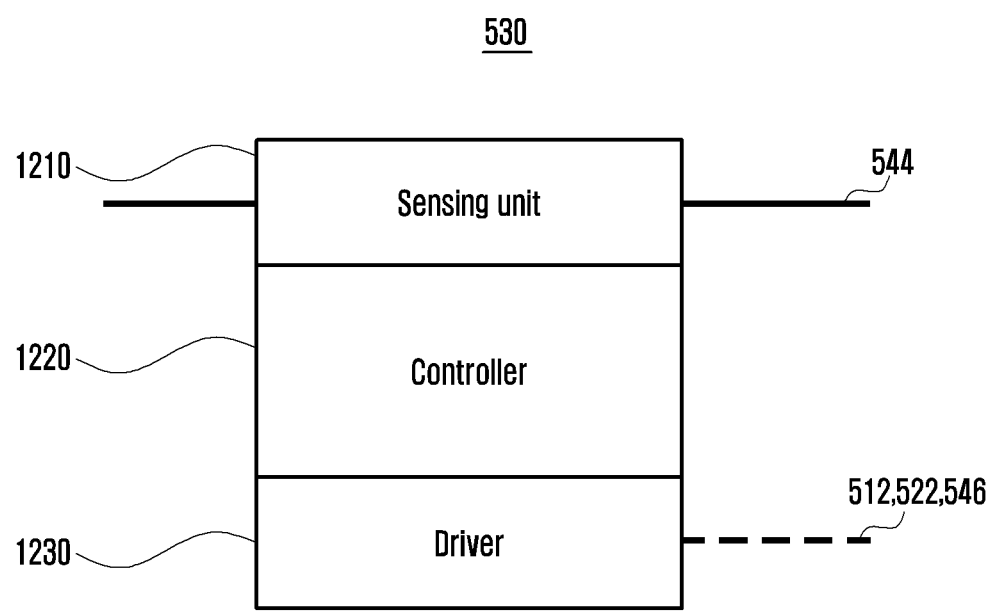
FIG. 12 is a block diagram illustrating an example cable controller according to various example embodiments of the present disclosure.
Figure 13:
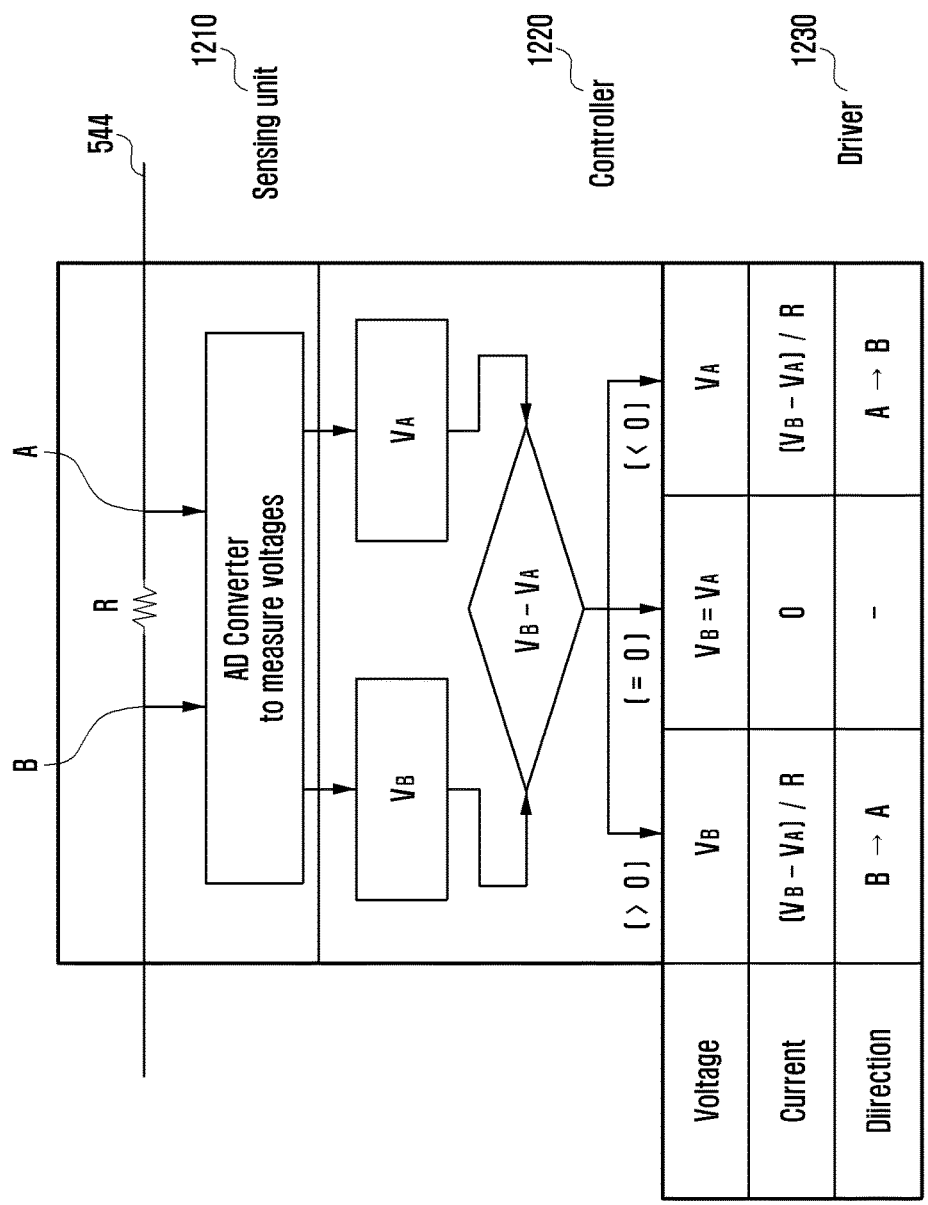
FIG. 13 is a diagram illustrating an example operation of a cable controller according to various example embodiments of the present disclosure.

FIG. 12 is a block diagram illustrating an example cable controller according to various example embodiments of the present disclosure. FIG. 13 is a diagram illustrating example operation of a cable controller according to various example embodiments of the present disclosure.

With reference to FIGS. 12 and 13, the cable controller 530 may include a sensing unit (e.g., including sensing circuitry) 1210, a controller (e.g., including processing circuitry) 1220, and a driver 1230.

The sensing unit 1210 may include various sensing circuitry and be connected to the power line 544 to sense power transmitted through the power line 544. The sensing unit 1210 may sense a both-end voltage at a specific segment of the power line 544. For example, the sensing unit 1210 may measure a both-end voltage of a point A or a point B of a specific segment of the power line 544. The sensing unit 1210 may sense a voltage of the point A and a voltage of the point B. The sensing unit 1210 may include an analog-digital convertor that converts and outputs a sensed voltage of an analog form to a digital value.

The controller 1220 may include various processing circuitry and compare magnitudes of a both-end voltage provided from the sensing unit 1210 and output a comparison result. For example, the controller 1220 may perform subtraction between a voltage of the point A and a voltage of the point B provided from the sensing unit 1210 and output a result of the subtraction.

The driver 1230 may determine at least one condition that drives the notification device according to a comparison result provided from the controller 1220.

For example, the driver 1230 may identify a magnitude and a direction of a current transmitted through the power line 544 based on a result value of subtraction in the controller 1220. For example, when a value that subtracts a voltage of the point A from a voltage of the point B is larger than 0, the driver 1230 may determine that a current direction is a direction advancing from the point B to the point A. If a value that subtracts a voltage of the point A from a voltage of the point B is smaller than 0, the driver 1230 may determine that a current direction is a direction advancing from the point A to the point B. If a value that subtracts a voltage of the point A from a voltage of the point B is 0, the driver 1230 may determine that a current does not flow.

The driver 1230 may output a driving signal with reference to a data table (not shown) to which a driving condition of the notification device is mapped according to each condition of a magnitude of a voltage or a current and a direction of a current. For example, as shown in Table 1, the data table may include a form in which a voltage and a color of light are mapped. Alternatively, the data table may include a form in which a current and a flickering speed of light are mapped. Alternatively, the data table may include a form in which a direction of a current and a lighting position of light are mapped.

At least one condition that drives the notification device may be a single condition or a plurality of conditions selected from a color of light, brightness of light, a lighting position, whether light is flickered, and a flickering speed.

According to another example embodiment, a notification device is positioned in at least one of the first and second connectors 510 and 520 and may be configured with a speaker or a beep sound module that outputs sound in response to the driving signal. In this case, at least one condition that drives the notification device may be a single condition or a plurality of conditions selected from a kind of sound, a magnitude of sound, an output position of sound, whether sound is repeated, and a repetition speed of sound.

According to another example embodiment, the notification device is positioned in at least one of the first and second connectors 510 and 520 and may be configured with a vibrator that outputs a vibration in response to the driving signal. In this case, at least one condition that drives the notification device may be a single condition or a plurality of conditions selected from a kind of a vibration, a magnitude of a vibration, an output position of a vibration, whether a vibration is repeated, and a repetition speed of a vibration.

Figure 14:
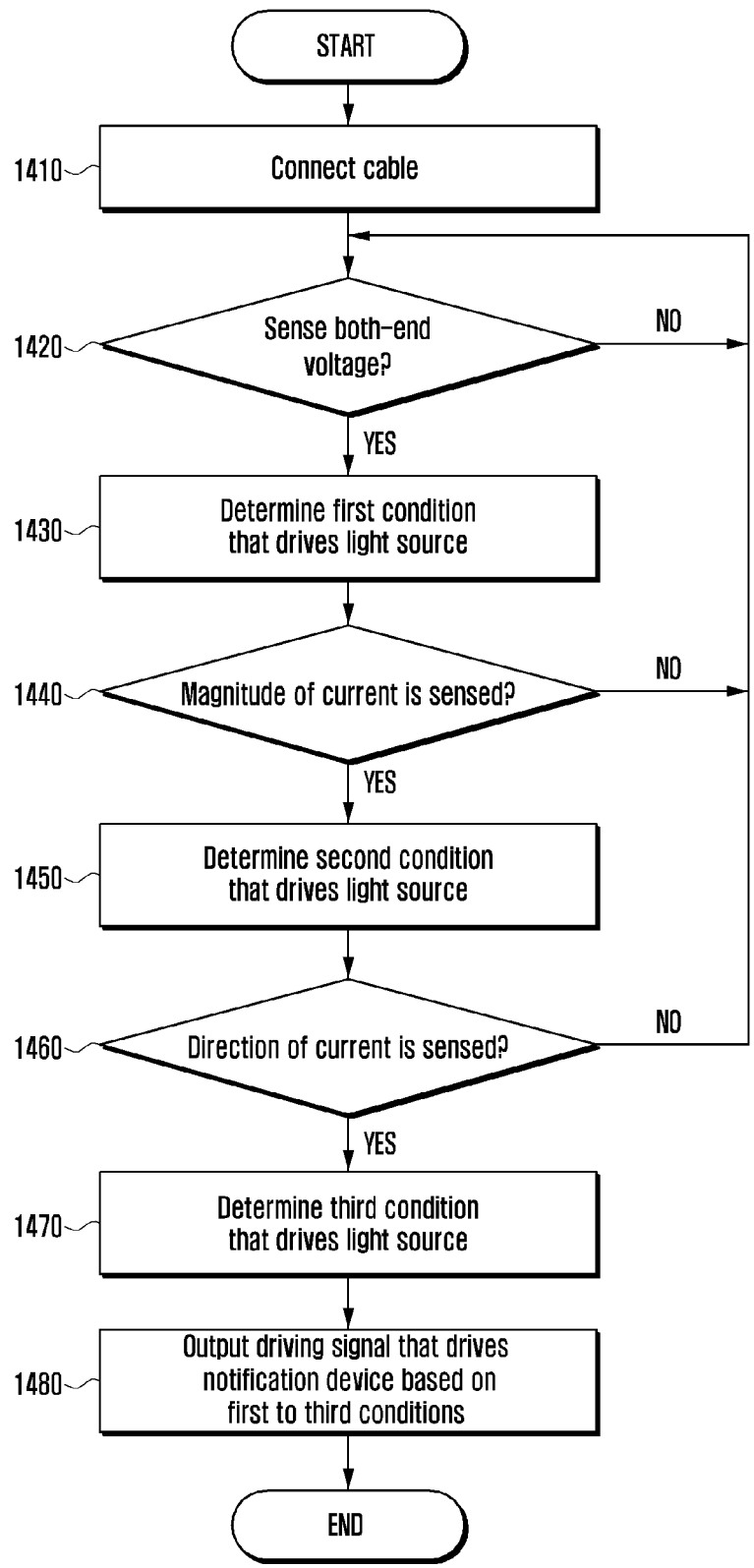
FIG. 14 is a flowchart illustrating an example of operation of determining a condition that drives a notification device according to an example embodiment of the present disclosure.

FIG. 14 is a flowchart illustrating an example of an operation of determining a condition that drives a notification device according to an example embodiment of the present disclosure.

Hereinafter, an example of the operation in which the cable controller 530 determines a condition that drives the notification device will be described with reference to FIG. 14. The illustrated example corresponds to a case in which the notification device is configured with the LEDs 512 and 522 or is configured with the light emitting line 546.

When the cable 500 is connected to the electronic device, operation of the cable controller 530 may be activated at operation 1410.

The sensing unit 1210 may sense a both-end voltage at a specific segment of the power line 544 at operation 1420. The controller 1220 may compare magnitudes of a both-end voltage provided from the sensing unit 1210 and output a comparison result. The driver 1230 may identify (sense) a magnitude of a voltage transmitted through the power line 544 based on a result of subtraction in the controller 1220.

The driver 1230 may determine a first condition that drives a light source at operation 1430 based on an identified voltage magnitude. For example, the first condition may be a color and brightness of light output from a light source.

The driver 1230 may identify (sense) a magnitude of a current transmitted through the power line 544 at operation 1440 based on a result value of subtraction in the controller 1220.

The driver 1230 may determine a second condition that drives a light source at operation 1450 based on the identified current magnitude. For example, the second condition may be a flickering speed of a light source.

The driver 1230 may identify (sense) a direction of a current transmitted through the power line 544 at operation 1460 based on a result value of subtraction in the controller 1220.

The driver 1230 may determine a third condition that drives a light source at operation 1470 based on an identified current direction. For example, the third condition may be a lighting position of a light source.

The driver 1230 may output a driving signal that drives the notification device at operation 1480 based on the determined first to third conditions.

An electronic device according to various example embodiments of the present disclosure includes an input and output interface circuit having a port that may be connected to a cable including a data line that transmits data and a power line that transmits power; and a processor that controls the input and output interface circuit, wherein the processor determines whether the cable is connected to the port, executes an application program that provides a user interface that transmits and receives data or power through the cable, if the cable is connected to the port, receives a user input through the user interface, transmits or receives power through the power line, and controls a notification device provided in the cable to output a notification based on a characteristic of power transmitted or received through the power line. The processor may identify a magnitude of a voltage, a magnitude of a current, and a direction of a current transmitted through the power line and change a notification output from the notification device according to an identified result.

Figure 15:
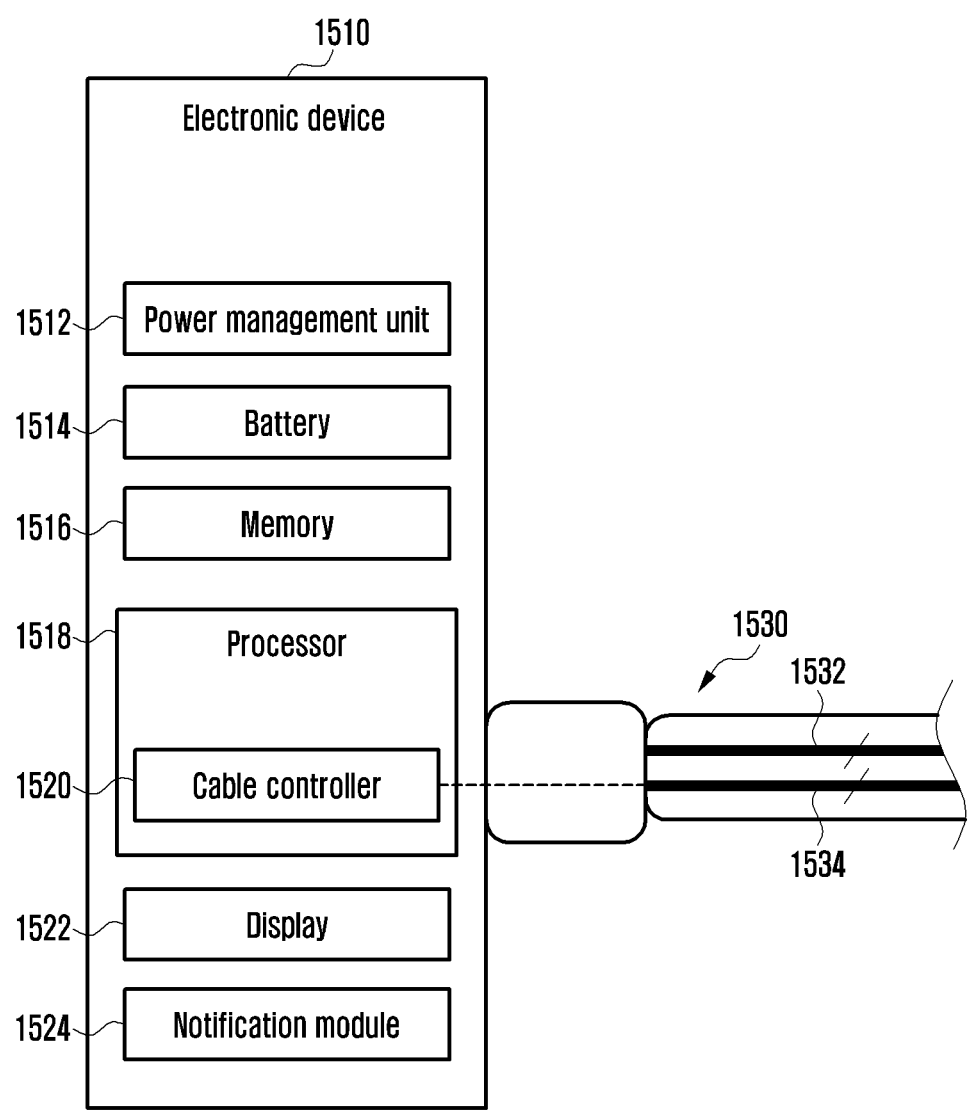
FIG. 15 is a block diagram illustrating an example power and data transmitting environment between electronic devices according to various example embodiments of the present disclosure.

FIG. 15 is a block diagram illustrating an example power and data transmitting environment between electronic devices according to various example embodiments of the present disclosure.

With reference to FIG. 15, according to various example embodiments of the present disclosure, a cable controller 1520 provided at a cable 1530 (e.g., the cable 500) may be housed in an electronic device 1510, and a notification device 1524 provided at the cable 1530 may be controlled by the electronic device 1510.

The electronic device 1510 may include a battery 1514 that stores power, memory 1516 that stores specific data, power management unit 1512 that manages a battery and that supplies power to each component of the electronic device 1510, display 1522, notification module (e.g., including notification circuitry) 1524, and processor (e.g., including processing circuitry) 1518 that controls each component of the electronic device 1510. The electronic device 1510 may further include a port (not shown) for connecting the cable 1530.

According to an example embodiment, when the processor 1518 of the electronic device 1510 is connected to the cable 1530, the processor 1518 may include a cable controller 1520 that controls a notification device provided at the cable 1530. For example, the cable controller 1520 may be connected to a port connected to a power line 1534 among a data line 1532 of the cable 1530 to identify (determine) a magnitude of a voltage or a current transmitted or received through the cable 1530 and a direction of a current and to control a notification of the notification device provided at the cable 1530 based on an identified result.

For example, when the cable 1530 is connected to a port, the cable controller 1520 may execute an application program, for example a data transmission and reception application program or a power transmission and reception application program related to the cable 1530. According to an example embodiment, the application programs may provide a function of performing data transmission and reception to and from another electronic device connected through the cable 1530 or may provide a function of performing power transmission and reception to and from the another electronic device. According to an example embodiment, the application programs may provide a user interface for performing a data transmission and reception function or a power transmission and reception function.

According to an example embodiment, the cable controller 1520 may receive or transmit data through the cable 1530 based on a user input received from a user. Alternatively, the cable controller 1520 may receive or transmit power through the cable 1530 based on a user input received from the user. According to various example embodiments, when receiving or transmitting power through the cable 1530, the cable controller 1520 may change a notification output from a notification device of the cable 1530 to correspond to a characteristic of the power, for example a magnitude of a voltage or a current and a direction of a current.

According to another example embodiment, in the cable 1530, a notification device may be removed.

For example, when receiving or transmitting power through the cable 1530, the cable controller 1520 may change an output of the notification module 1524. According to an example embodiment, the notification module 1524 may include a single element or a plurality of elements selected from a display, LED module, vibration module, and speaker module. For example, the cable controller 1520 may provide a display screen according to a magnitude of a voltage or a current and a direction of a current transmitted or received through the cable 1530, emit LED light, output a haptic vibration, or output a sound notification.

Figure 16:
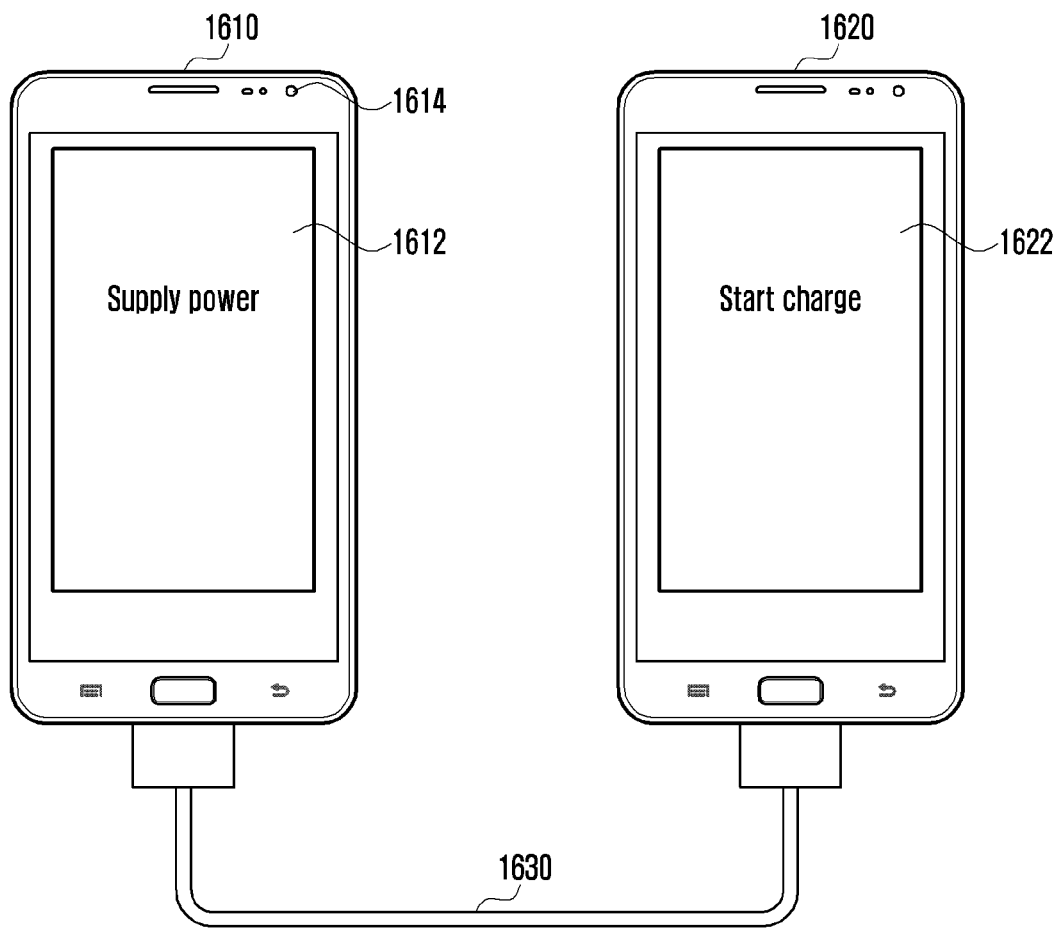
FIG. 16 is a diagram illustrating an example of transmitting power using a cable according to an example embodiment of the present disclosure.

FIG. 16 is a diagram illustrating an example of transmitting power using a cable according to an example embodiment of the present disclosure.

With reference to FIG. 16, for example, a cable 1630 (e.g., the cable 1530) may be connected to first and second electronic devices 1610 and 1620, and the first and second electronic devices 1610 and 1620 may be smart phones.

According to an example embodiment, when the cable 1630 is connected to the first and second electronic devices 1610 and 1620, the first and second electronic devices 1610 and 1620 may identify a characteristic of power transmitted through a power line 1634 of the cable 1630 and output a notification based on the identified power characteristic. For example, a notification may be output in a form in which a display 1612 outputs a message "supply power" or a message "start charge". Alternatively, a notification may be output in a form in which the display 1622 outputs a message notifying a magnitude of a voltage or a current and a direction of a current. According to another example embodiment, a notification may be output in a form in which an LED module 1614 outputs light, a form in which a vibration module (not shown) outputs a vibration, or a form in which a speaker module (not shown) outputs sound. For example, a notification may be output in a form in which the LED module 1614 is driven according to a predetermined color, brightness, and flickering speed.

As described above, according to various example embodiments of the present disclosure, by outputting a notification based on a characteristic of power currently transmitted through a cable, convenience can be provided to a user.

A programming module according to embodiments of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the disclosure has been illustrated and described with reference to various example embodiments thereof, it will be understood by those skilled in the art that various changes in form and detail may be made therein without departing from the spirit and scope of the disclosure as defined by the appended claims.

What is claimed is:

1. A cable configured to transmit data and power, the cable comprising:
   a notification device comprising notification circuitry configured to output a notification, when the power is transmitted;
   a first connector positioned at one end of the cable;
   a second connector positioned at another end of the cable;
   a wire structure connecting the first and second connectors and comprising a data line configured to transmit the data and a power line configured to transmit the power; and
   a cable controller connected to the power line and configured to identify a characteristic of power transmitted through the power line and to change a form of the notification output from the notification device based on the identified power characteristic,
   wherein the characteristic of power includes a direction of a current transmitted through the power line, the direction of the current including a first direction that moves from the first connector to the second connector, and a second direction that moves from the second connector to the first connector;
   wherein the first connector is configured to output a predetermined color and change brightness based on magnitude of voltage, and
   wherein the second connector is configured to output another predetermined color and change brightness based on magnitude of voltage.

2. The cable of claim 1, wherein the cable controller is configured to identify a magnitude of a voltage, a magnitude of a current, and the direction of the current transmitted through the power line and to output a driving signal for driving the notification device based on the identified result.

3. The cable of claim 2, wherein the cable controller comprises:
   a sensing unit comprising sensing circuitry configured to sense a both-end voltage at a specific segment of the power line;
   a controller configured to compare magnitudes of the both-end voltage and to output a comparison result; and
   a driver comprising driving circuitry and configured to determine at least one condition that drives the notification device based on the comparison result and to output the driving signal based on the determined condition.

4. The cable of claim 3, wherein the notification device comprises a light emitting line positioned substantially parallel to the data line or the power line and configured to output light in response to the driving signal.

5. The cable of claim 4, wherein the light emitting line comprises a single line or a plurality of lines configured to output light of a plurality of colors and to output light of a color corresponding to the driving signal.

6. The cable of claim 3, wherein the notification device comprises at least one Light Emitting Diode (LED) positioned at least one of the first and second connectors and that is configured to output light in response to the driving signal.

7. The cable of claim 6, wherein the at least one LED comprises a single LED element or a plurality of LED elements configured to output light of a plurality of colors and to output light of a color corresponding to the driving signal.

8. The cable of claim 3, wherein the notification device comprises at least one LED positioned at each of the first and second connectors and is configured to output light in response to the driving signal.

9. The cable of claim 8, wherein the at least one LED comprises a single LED element or a plurality of LED elements configured to output light of a plurality of colors and to output light of a color corresponding to the driving signal.

10. The cable of claim 3, wherein the at least one condition that drives the notification device comprises a single condition or a plurality of conditions comprising at least one of: a color of light, brightness of light, a lighting position, whether light is flickered, and a flickering speed.

11. The cable of claim 1, wherein the first connector comprises a single connector or a plurality of connectors, and the second connector comprises a single connector or a plurality of connectors.

12. A method of driving a cable that transmits data and power, the method comprising:
connecting the cable to a power line that transmits power;
identifying a characteristic of power transmitted through the power line; and
driving a notification device based on the identified power characteristic,
wherein the characteristic of power includes a direction of a current transmitted through the power line, the direction of the current including a first direction from the first connector to the second connector and a second direction from the second connector to the first connector;
wherein the first connector outputs a predetermined color and changes brightness based on magnitude of voltage, and
wherein the second connector outputs another predetermined color and changes brightness based on magnitude of voltage.

13. The method of claim 12, wherein identifying a characteristic of power transmitted through the power line comprises identifying a magnitude of a voltage, a magnitude of a current, and a direction of a current transmitted through the power line.

14. The method of claim 13, wherein driving a notification device based on the identified power characteristic comprises outputting a driving signal that drives the notification device based on the identified result.

15. The method of claim 13, wherein identifying a characteristic of power transmitted through the power line comprises:
sensing a both-end voltage at a specific segment of the power line;
comparing magnitudes of the both-end voltage;
outputting a comparison result; and
determining at least one condition that drives the notification device based on the comparison result and outputting the driving signal based on the determined condition.

16. The method of claim 14, wherein the notification device comprises a light emitting line positioned substantially parallel to the power line and configured to output light in response to the driving signal.

17. The method of claim 14, wherein the notification device comprises at least one Light Emitting Diode (LED) positioned in at least one of a first connector positioned at one end of the cable and a second connector positioned at another end of the cable and configured to output light in response to the driving signal.

18. The method of claim 15, wherein at least one condition that drives the notification device comprises a condition including at least one of: a color of light, brightness of light, a lighting position, whether light is flickered, and a flickering speed.

19. An electronic device, comprising:
an input and output interface circuit comprising
a port configured to be connected to a cable comprising a data line that transmits data and a power line that transmits power; and
a processor configured to control the input and output interface circuit,
wherein the processor is configured to determine whether the cable is connected to the port, to execute an application program that provides a user interface, if the cable is connected to the port, to receive an input through the user interface, to transmit or receive power through the power line, and to control a notification device provided in the cable to output a notification based on a characteristic of power transmitted or received through the power line,
wherein the characteristic of power includes a direction of a current transmitted through the power line, the direction of the current including a first direction from a first connector to a second connector and a second direction from the second connector to the first connector;
wherein the first connector is configured to output a predetermined color and change brightness based on magnitude of voltage, and
wherein the second connector is configured to output another predetermined color and change brightness based on magnitude of voltage.

20. The electronic device of claim 19, wherein the processor is configured to identify a magnitude of a voltage, a magnitude of a current, and the direction of the current transmitted through the power line and to change a notification output from the notification device based on an identified result.

* * * * *